US009116647B2

(12) United States Patent
Iwadate

(10) Patent No.: US 9,116,647 B2
(45) Date of Patent: Aug. 25, 2015

(54) LINKING A PLURALITY OF INFORMATION PROCESSING APPARATUSES

(71) Applicant: CANON KABUSHIKI KAISHA, Tokyo (JP)

(72) Inventor: Masahiro Iwadate, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 14/322,646

(22) Filed: Jul. 2, 2014

(65) Prior Publication Data

US 2015/0009521 A1    Jan. 8, 2015

(30) Foreign Application Priority Data

Jul. 4, 2013   (JP) ................... 2013-140550

(51) Int. Cl.
*G06F 3/12*      (2006.01)
*H04N 1/00*      (2006.01)

(52) U.S. Cl.
CPC .............. *G06F 3/1238* (2013.01); *G06F 3/126* (2013.01); *G06F 3/1222* (2013.01); *G06F 3/1236* (2013.01); *G06F 3/1291* (2013.01); *H04N 1/00127* (2013.01)

(58) Field of Classification Search
None
See application file for complete search history.

(56) References Cited

U.S. PATENT DOCUMENTS

| 8,531,690 | B2 * | 9/2013 | Takahashi | 358/1.13 |
| 2004/0057065 | A1 * | 3/2004 | Michimura et al. | 358/1.13 |
| 2005/0030582 | A1 * | 2/2005 | Xu | 358/1.15 |
| 2011/0128581 | A1 * | 6/2011 | Murakami | 358/1.15 |

FOREIGN PATENT DOCUMENTS

JP       2003-229867 A       8/2003

* cited by examiner

*Primary Examiner* — Jeremiah Bryar
(74) *Attorney, Agent, or Firm* — Canon USA, Inc., IP Division

(57) ABSTRACT

An image forming apparatus A adds a user ID of a user, who has requested a job, to job information about the job to be processed in linkage to store it. The image forming apparatus A receives a user's linkage instruction together with the user ID of the user. When the received user ID matches the user ID added to the job information, the image forming apparatus A transmits a request message including the user ID and for establishing linkage with other image forming apparatuses B and C. The image forming apparatus B receives the request message, and receives a user's linkage instruction together with the user ID of the user. When the user ID included in the received request message and the user ID received from the user match each other, the image forming apparatus B transmits a reply message permitting linkage to the image forming apparatus A.

12 Claims, 35 Drawing Sheets

| LINKAGE SOURCE DEVICE ID | REQUEST ID | JOB ID | USER ID | JOB TYPE |

FIG.31

SELECT LINKAGE TARGET JOB.  3001

| SELECT | JOB ID | JOB NAME | JOB TYPE | JOB STATE | NUMBER OF PAGES | NUMBER OF COPIES |
|---|---|---|---|---|---|---|
| ☐ | J1 | No Name | COPY | PRINTING | 10 | 54 |
| ■ | J3 | PROJECT PLAN DOCUMENT | PRINT | WAITING FOR PRINTING | 138 | 22 |
| ☐ | J8 | BRIEFING DISTRIBUTED MATERIAL | PRINT | WAITING FOR PRINTING | 24 | 48 |

| LINKAGE SOURCE DEVICE ID | REQUEST ID | JOB ID | USER ID | JOB TYPE | LINKAGE FORM |
|---|---|---|---|---|---|

FIG.34

| LINKAGE DESTINATION DEVICE ID | REQUEST ID | JOB ID | LINKAGE FORM |
|---|---|---|---|

LINKING A PLURALITY OF INFORMATION PROCESSING APPARATUSES

BACKGROUND

1. Field

Aspects of the present invention generally relate to a technology for linking information processing apparatuses such as printers or multifunction peripherals.

2. Description of the Related Art

An image forming system is configured by interconnecting a plurality of image forming apparatuses to be communicable with one another via a network such as a local area network (LAN) or short-range wireless communication. There is even an image forming system configured such that a plurality of image forming apparatuses are linked to form an image. Linking the plurality of image forming apparatuses enables distribution execution of a print job such as copying or printing among the image forming apparatuses or transfer to an image forming apparatus of a linkage destination.

To link the plurality of image forming apparatuses, it is desirable to establish linkage by an intuitive and simple operation. Japanese Patent Application Laid-Open No. 2003-229867 discusses a technology for linking two or more communication devices by pressing buttons. Pressing buttons at a communication device of a linkage source and a communication device of linkage destination enables establishment of linkage between these communication devices.

When a print job is executed in linkage among the plurality of image forming apparatuses, the print job generally starts after an image forming apparatus of a linkage destination is selected based on an address. However, after the start of the print job at one image forming apparatus, the print job may be executed in linkage with another image forming apparatus in the midway. For example, after the start of copying at one image forming apparatus, if a nearby image forming apparatus is not executing any job, the copying may be continued by using this nearby image forming apparatus. Accordingly, when the print job is executed in linkage with the nearby image forming apparatus on the spur of the moment, it is desirable to establish the linkage by an intuitive and simple method. The method discussed in Japanese Patent Application Laid-Open No. 2003-229867 can satisfy such requirements because the linkage can be established by pressing the buttons.

However, anybody can press the button. As a result, linkage is established even when users who have pressed the button at the image forming apparatus of the linkage source and the button at the image forming apparatus of the linkage destination are different. In this case, by the other's operation, a print product may be output to an image forming apparatus unintended by the user. The user may operate the other's job by mistake. In an environment such as an office where a plurality of users shares an image forming system, such erroneous operations need to be prevented.

SUMMARY

Aspects of the present invention are generally directed to an image forming system capable of preventing establishment of erroneous linkage among a plurality of image forming apparatuses.

According to an aspect of the present invention, an information processing apparatus includes an acquisition unit configured to acquire user identification information for identifying a user, a reception unit configured to receive a request message which is for requesting establishment of linkage and which includes user identification information from another information processing apparatus, a determination unit configured to determine whether the user identification information included in the request message received by the reception unit and the user identification information acquired by the acquisition unit correspond to each other, and a transmission unit configured to transmit a reply message permitting linkage to the another information processing apparatus as a response to the request message according to a determination result of the determination unit.

Further features and aspects of the present disclosure will become apparent from the following detailed description of exemplary embodiments with reference to the attached drawings.

BRIEF DESCRIPTION OF THE DRAWINGS

FIG. 7 is a diagram illustrating an example of a request message.

FIG. 31 is a diagram illustrating an example of a linkage target job selection screen.

FIG. 32 is a diagram illustrating an example of a request message.

FIG. 34 is a diagram illustrating an example of a reply message.

DESCRIPTION OF THE EMBODIMENTS

Various exemplary embodiments will be described in detail below with reference to the drawings.
<Image Forming System>

Figure 1:
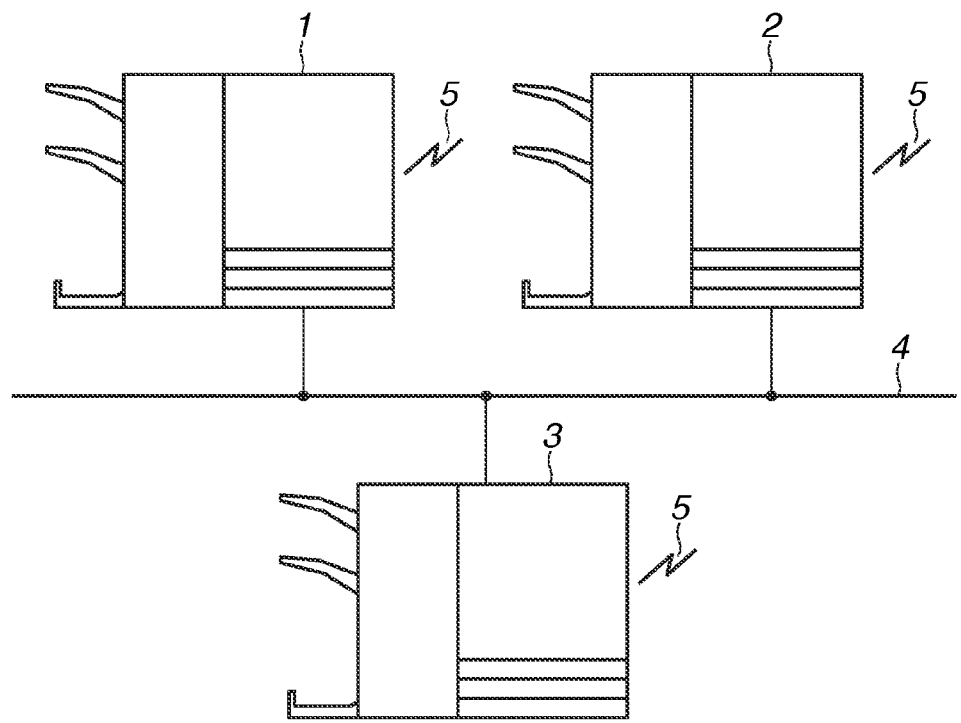
FIG. 1 is a diagram illustrating an overall configuration of an image forming system.

FIG. 1 is a diagram illustrating an overall configuration of an image forming system according to an exemplary embodiment. The image forming system is configured by interconnecting a plurality of image forming apparatuses 1 to 3 to be communicable with one another via a network such as a LAN. Each of the image forming apparatuses 1 to 3 can perform wireless communication 5. Each of the image forming apparatuses 1 to 3 establishes linkage by using the wireless communication 5. Communication of a message or the like described hereinafter for establishing linkage is performed by the wireless communication 5. Among image forming apparatuses linked with one another, image data used for forming an image is transmitted/received via a network 4. Thus, the image forming system is a communication system that includes the image forming apparatuses 1 to 3 as communication apparatuses.
<Image Forming Apparatus>

Figure 2:
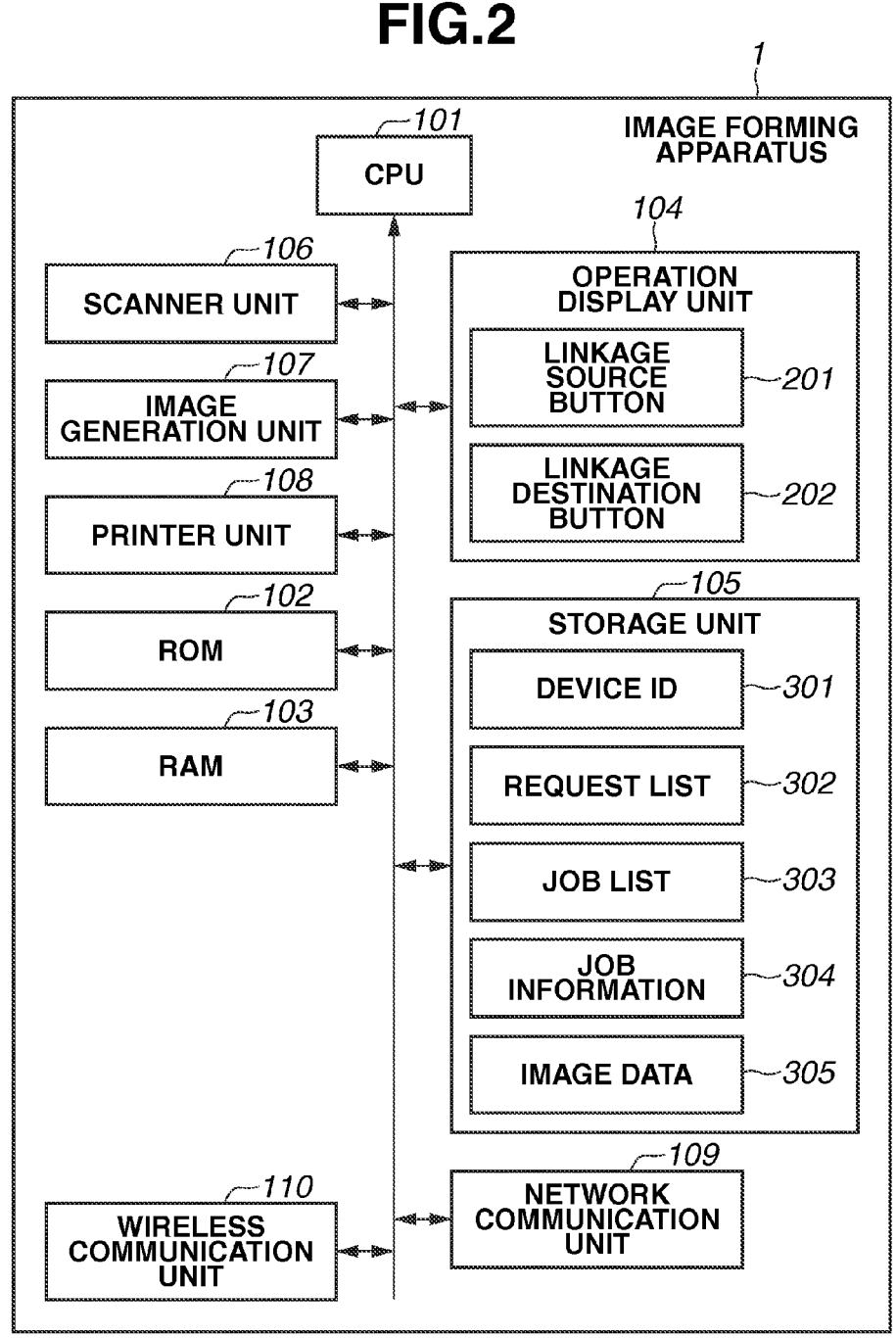
FIG. 2 is a diagram illustrating a hardware configuration of an image forming apparatus.

FIG. 2 is a diagram illustrating a hardware configuration of the image forming apparatus 1. The image forming apparatuses 2 and 3 are realized by the same hardware as in the case of the image forming apparatus 1. The configuration of the image forming apparatus 1 will be described while omitting description of the configurations of the image forming apparatuses 2 and 3.

The image forming apparatus 1 includes, to perform overall control of processes of respective units, a central processing unit (CPU) 101, a read-only memory (ROM) 102, and a random access memory (RAM) 103. The CPU 101 reads a computer program stored in the ROM 102, and executes the computer program by using the RAM 103 as a work area to control a process of each unit. The image forming apparatus 1 further includes an operation display unit 104, a storage unit 105, a scanner unit 106, an image generation unit 107, a printer unit 108, a network communication unit 109, and a wireless communication unit 110.

The operation display unit 104, which is a touch panel configured by combining, for example, a display and a touch pad, receives a user's operation or displays various operation screens. The operation display unit 104 includes a linkage source button 201 and a linkage destination button 202 for linking with the other image forming apparatuses 2 and 3. The linkage source button 201 and the linkage destination button 202 can be software buttons capable of performing, for example, a user interface (UI) operation on the touch panel. The operation display unit 104 can include a keyboard or buttons by software or hardware.

The storage unit 105 stores device ID 301 (Internet Protocol (IP) address), a request list 302, a job list 303, job information 304, and image data 305 that is a target for image formation. The device ID 301, the request list 302, the job list 303, and the job information 304 are pieces of information used for linking with the other image forming apparatuses 2 and 3.

Figure 3:
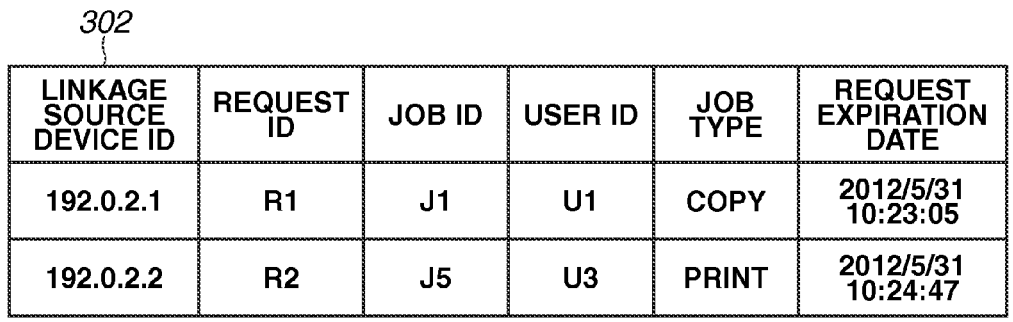
FIG. 3 is a diagram illustrating an example of a request list.

FIG. 3 is a diagram illustrating an example of the request list 302. The request list 302 is generated when the image forming apparatus 1 is linked with the other image forming apparatuses 2 and 3. The request list 302 includes items of "Device ID", "Request ID", "Job ID", "User ID", "Job Type", and "Request Expiration Date (and Time)" of the image forming apparatus that is a linkage source.

Figure 4:
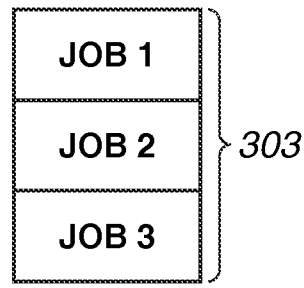
FIG. 4 is a diagram illustrating an example of a job list.

FIG. 4 is a diagram illustrating an example of the job list 303. The job list 303 includes data (i.e., job ID) for identifying the job information 304.

Figure 5:
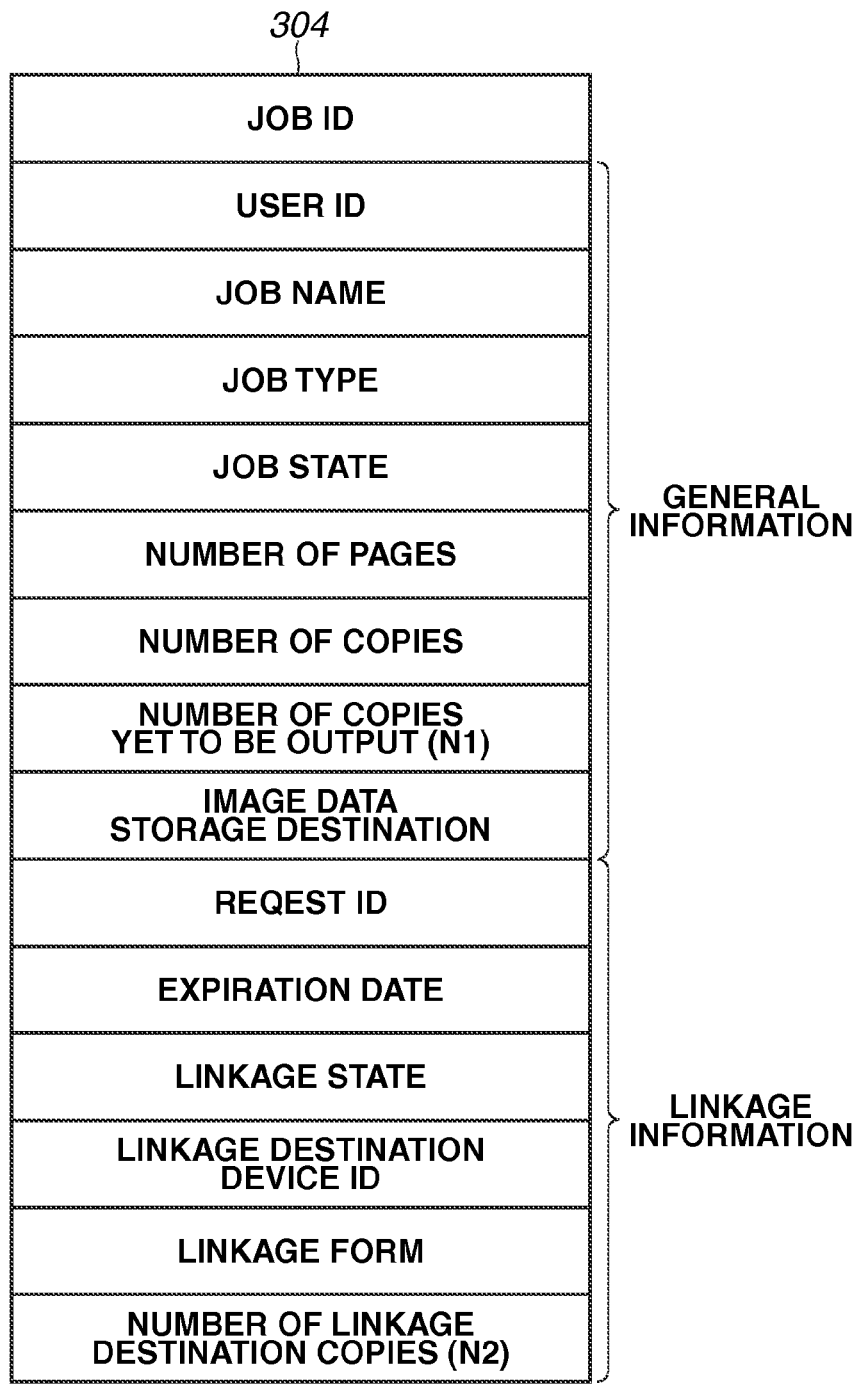
FIG. 5 is a diagram illustrating an example of job information.

FIG. 5 is a diagram illustrating an example of the job information 304. The job information 304 includes job ID for identifying a job, general information, and linkage information. The general information includes user identification information (user ID) for identifying a user who has requested a job.

The scanner unit 106 generates image data 305 that is a target for image formation by scanning a document. The scanner unit 106 causes the storage unit 105 to store the generated image data 305. The image generation unit 107 generates image data 305 based on print data received from an external apparatus (not illustrated). The image generation unit 107 causes the storage unit 105 to store the generated image data 305. The printer unit 108 performs image forming processing to form an image on recording paper according to the image data 305 stored in the storage unit 105.

The network communication unit 109 is a communication interface for performing communication with the other image forming apparatuses 2 and 3 and the external apparatus via the network 4. The image forming apparatus 1 can transmit/receive the image data 305 with the other image forming apparatuses 2 and 3 by the network communication unit 109. The image forming apparatus 1 can receive the image data 305 from the external apparatus by the network communication unit 109. The wireless communication unit 110 performs wireless communication 5 by short-range wireless communication or a wireless LAN. The image forming apparatus 1 performs wireless communication 5 with the other proximate image forming apparatuses 2 and 3 by the wireless communication unit 110 to establish linkage.

Figure 6:
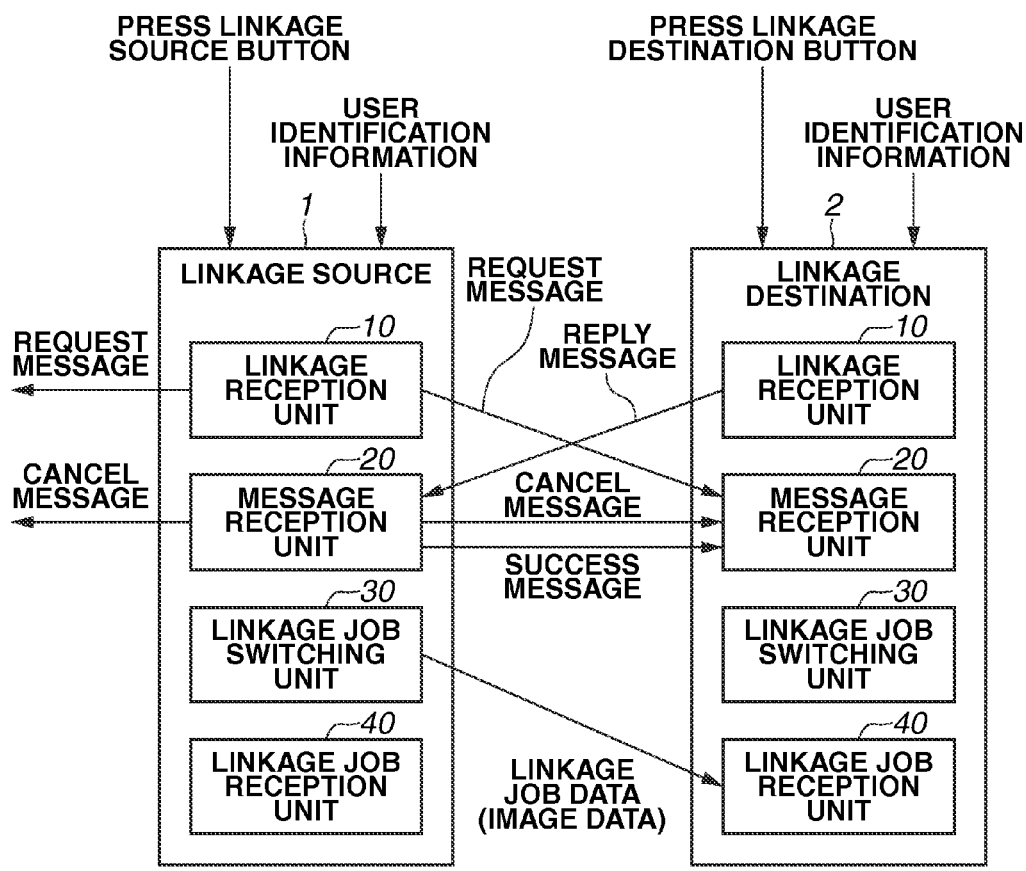
FIG. 6 is a functional block diagram illustrating the image forming apparatus.

FIG. 6 is a functional block diagram illustrating functions formed in the image forming apparatus by executing the computer program stored in the ROM 102 by the CPU 101. FIG. 6 illustrates functional blocks formed in the image forming apparatus 1 and the image forming apparatus 2, and a message or data is notified from each functional block during linkage. In the image forming apparatus 1, a linkage reception unit 10, a message reception unit 20, a linkage job switching unit 30, and a linkage job reception unit 40 are formed.

The linkage reception unit 10 receives an instruction from the linkage source button 201 and the linkage destination button 202, or user ID for identifying a user who has operated the linkage source button 201 and the linkage destination button 202. The linkage reception unit 10 functions as a linkage instruction reception unit when it receives a linkage instruction from the linkage source button 201, and as a linkage permission reception unit when it receives a linkage permission instruction from the linkage destination button 202.

The linkage reception unit 10 transmits a request message or a reply message for establishing linkage with another image forming apparatus based on the received instruction. The linkage reception unit 10 functions as a request message transmission unit when it transmits the request message, and as a reply message transmission unit when it transmits the reply message. An image forming apparatus of a linkage source that requests linkage to another image forming apparatus broadcasts a request message. An image forming apparatus of a linkage destination transmits to the image forming apparatus of the linkage source a reply message permitting linkage in response to the request message. In FIG. 6, the image forming apparatus 1 is a linkage source while the image forming apparatus 2 is a linkage destination.

FIG. 7 is a diagram illustrating an example of a request message. A request message 1301 includes a linkage source device ID, a request ID, a job ID, a user ID, and a job type. The linkage source ID is the device ID 301 of the image forming apparatus 1 of the linkage source that transmits the request message. The request ID is identification information for identifying the request message. The job ID is identification information for identifying a job executed in linkage. The user ID is identification information for identifying a user who requests linkage. The job type indicates a type of the job identified by the job ID.

Figure 8:
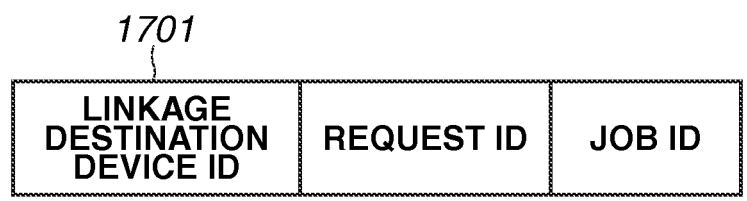
FIG. 8 is a diagram illustrating an example of a reply message.

FIG. 8 is a diagram illustrating an example of a reply message. A reply message 1701 includes a linkage destination device ID, a request ID, and a job ID. The linkage destination ID is the device ID 301 of the image forming apparatus 2 of the linkage destination that transmits the reply message. The request ID is included in the request message received from the image forming apparatus 1 of the linkage source. The job ID is included in the request message received from the image forming apparatus 1 of the linkage source.

The message reception unit 20 performs processing according to various messages received from the other image forming apparatuses. The message reception unit 20 receives reply messages from the other image forming apparatuses, and transmits/receives a cancel message and a success message with the other image forming apparatuses. The image forming apparatus 1 of the linkage source broadcasts the cancel message to notify the other image forming apparatuses 2 and 3 of cancellation of a linkage request. The image forming apparatus 1 of the linkage source transmits the success message to notify the image forming apparatus 2 of the linkage destination of its selection as a linkage destination.

Figure 9:
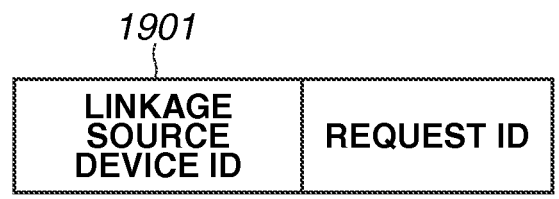
FIG. 9 is a diagram illustrating an example of a cancel message.

FIG. 9 is a diagram illustrating an example of a cancel message. A cancel message 1901 includes a linkage source device ID and a request ID. The linkage source device ID is the same device ID as the linkage source device ID included in the request message 1301 that was broadcasted before the cancel message 1901 is broadcasted. The request ID is the request ID of the request message 1301 for canceling the request by the cancel message 1901.

Figure 10:
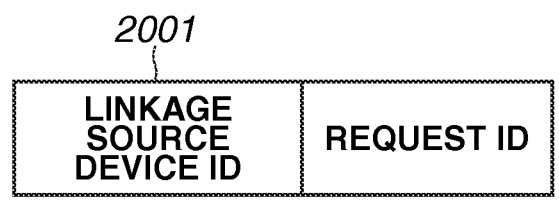
FIG. 10 is a diagram illustrating an example of a success message.

FIG. 10 is a diagram illustrating an example of a success message. A success message 2001 is the same as the cancel message 1901 in configuration. The success message 2001 is transmitted only to the image forming apparatus 2 of the linkage destination that has transmitted the reply message 1701. Accordingly, the image forming apparatus 2 selected as the linkage destination receives a message of the same content twice. The image forming apparatus 2 of the linkage destination can recognizes that it has been selected as the linkage destination by receiving the message of the same content twice. By adding information indicating a success message to the success message 2001, the image forming apparatus 2 of the linkage destination may be notified of its selection as the linkage destination.

The linkage job switching unit 30 switches a job in the image forming apparatus 2 selected as the linkage destination to a linkage job. Accordingly, the linkage job switching unit 30 transmits linkage job data including image data to the image forming apparatus 2 of the linkage destination. The linkage job reception unit 40 stores the linkage job data received from the image forming apparatus 1 of the linkage source. The job of the image forming apparatus 2 of the linkage destination is switched to the linkage job based on the linkage job data.

<Linkage Establishment Control>

Figure 11:
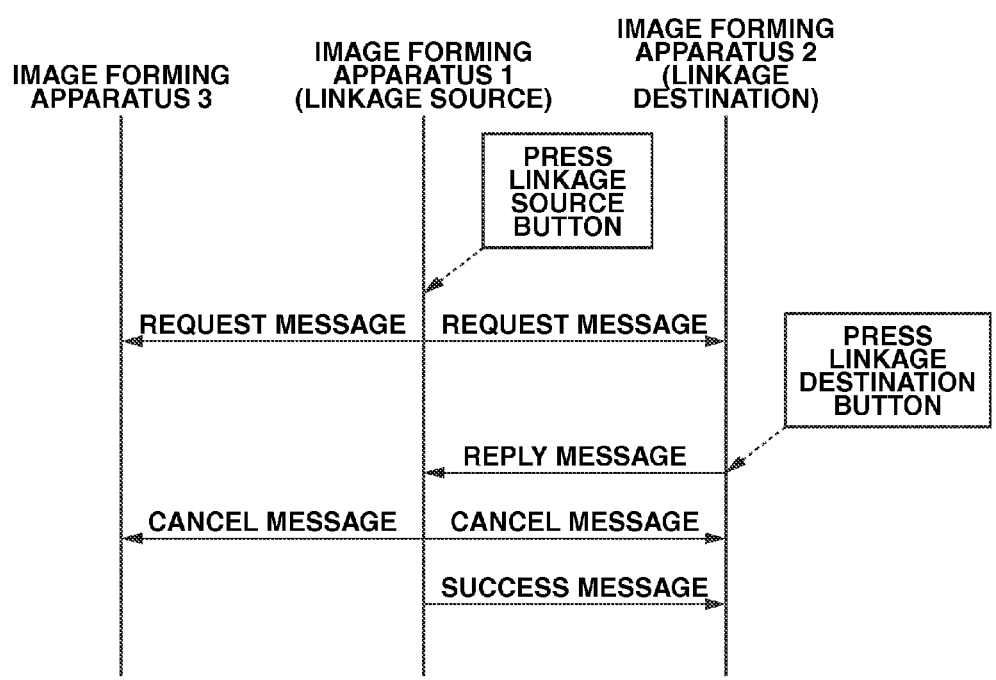
FIG. 11 is an explanatory diagram illustrating notification timing of a message.

FIG. 11 is an explanatory diagram illustrating notification timing of various messages transmitted/received when linkage is established between the image forming apparatuses. Each message is transmitted/received between the image forming apparatus via the wireless communication unit 110 under control of the CPU 101. In the example illustrated in FIG. 11, the image forming apparatus 1 is a linkage source while the image forming apparatus 2 is a linkage destination.

After the linkage source button 201 has been pressed to input a linkage instruction for linkage with the other image forming apparatuses 2 and 3, the image forming apparatus 1 of the linkage source broadcasts a request message to the other image forming apparatuses 2 and 3. The image forming apparatuses 2 and 3 that have received the broadcast request message are instructed for linkage permission by an operation of the linkage destination button 202. In FIG. 11, the linkage destination button 202 of the image forming apparatus 2 is operated. The image forming apparatus 2 is instructed for linkage permission by the operation of the linkage destination button 202, and transmits, in response to the request message, a reply message to the image forming apparatus 1 of the linkage source that has transmitted the request message.

The image forming apparatus 1 of the linkage source, which has received the reply message from the image forming apparatus 2, broadcasts a cancel message for canceling the request message. The cancel message is broadcasted after the reception of the reply message, after a passage of predetermined time from the broadcasting of the request message, or at appropriate timing such as after reception of reply messages by predetermined times. The image forming apparatus 1 of the linkage source, which has broadcasted the cancel message, transmits to the image forming apparatus 2 of the linkage destination a success message indicating that linkage has been established. Linkage is established between the image forming apparatuses 1 and 2 after the reception of the success message at the image forming apparatus 2 of the linkage destination.

Processes of the linkage source button 201, the linkage destination button 202, and the image forming apparatuses 1 and 2 at the time of the reception of each message will be described in detail.

<Process During Button Operation>

Figure 12:
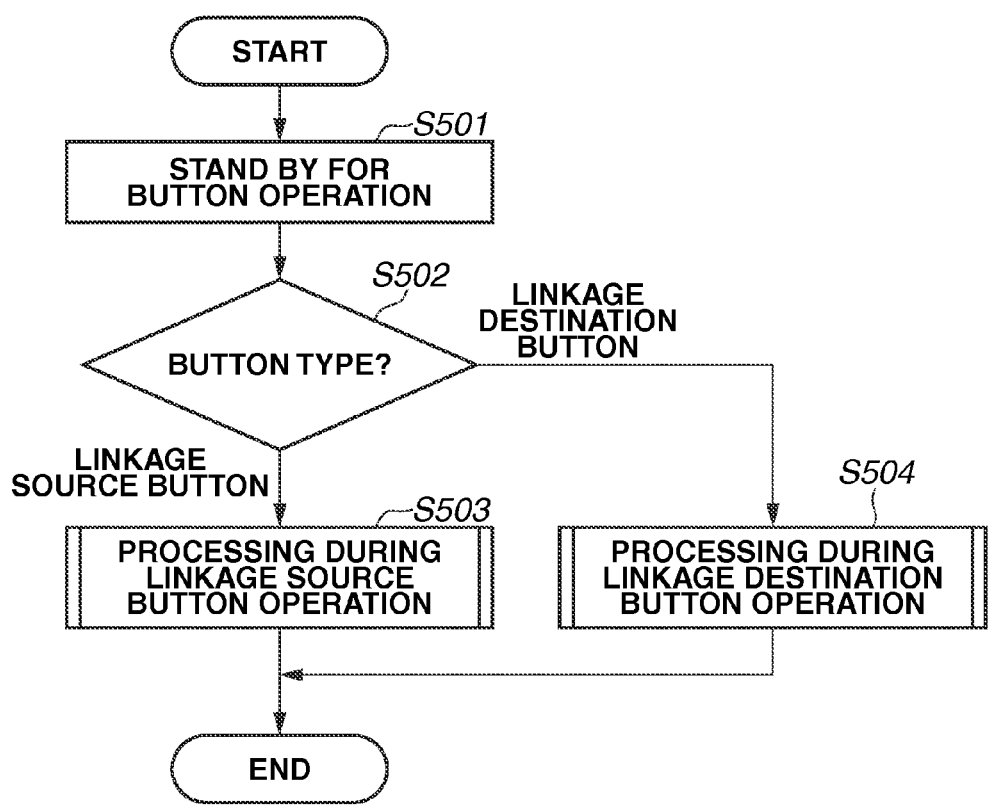
FIG. 12 is a flowchart illustrating processing of the image forming apparatus.

FIG. 12 is a flowchart illustrating processes of the image forming apparatuses 1 to 3 when the linkage source button 201 or the linkage destination button 202 is operated in the image forming apparatuses 1 to 3.

In step S501, the CPU 101 stands by until the linkage source button 201 or the linkage destination button 202 is operated (pressed). After the linkage source button 201 or the linkage destination button 202 has been operated, the CPU 101 acquires an instruction corresponding to the operated button from the operation display unit 104. In step S502, the CPU 101 determines the operated button according to the acquired instruction. For example, a linkage instruction is input when the linkage source button 201 is operated, and a linkage permission instruction is input when the linkage destination 202 is operated. Accordingly, the determination of the operated button is performed by determining which of the instructions has been acquired.

When the operated button is the linkage source button 201 (linkage source button in step S502), in step S503, the CPU 101 performs processing during the operation of the linkage source button 201. When the operated button is the linkage destination button 202 (linkage destination button in step S502), in step S504, the CPU 101 performs processing during the operation of the linkage destination button 202.

<Process During Operation of Linkage Source Button>

Figure 13:
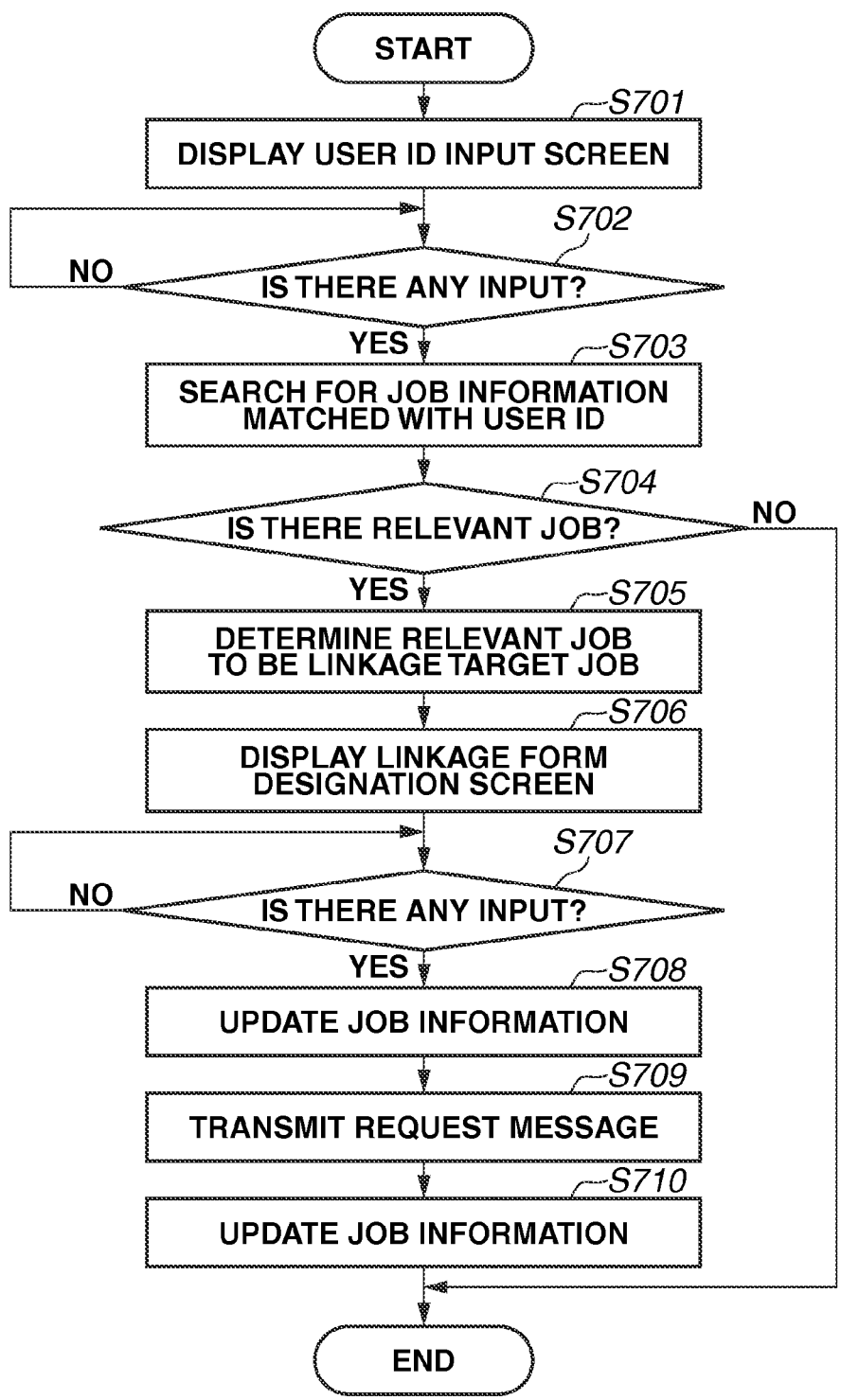
FIG. 13 is a flowchart illustrating a process during an operation of a linkage source button.

FIG. 13 is a flowchart illustrating a process during the operation of the linkage source button 201 (step S503 illustrated in FIG. 12). This process is performed by the linkage reception unit 10 of the CPU 101 when the linkage destination button 202 is operated. In the examples illustrated in FIGS. 6 and 11, the CPU 101 of the image forming apparatus 1 performs the process.

Figure 14:
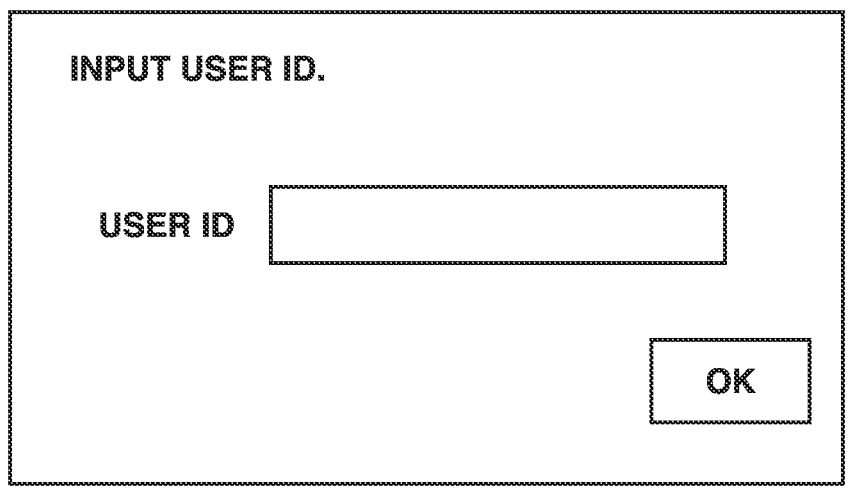
FIG. 14 is a diagram illustrating an example of a user identification (ID) input screen.

After the linkage source button 201 has been operated, in step S701, the CPU 101 displays a user ID input screen on the operation display unit 104 to identify a user who has operated the linkage source button 201. In step S702, after the user ID input screen has been displayed, the CPU 101 stands by until a user ID is input. FIG. 14 is a diagram illustrating an example of a user ID input screen. The user inputs a user ID by an input device such as a keyboard of the operation display unit 104. When the user presses an "OK" button after the user ID has been input, the input user ID is input to the CPU 101.

When the user ID has been input (YES in step S702), in step S703, the CPU 101 searches for the job information 304 including the user ID matched with the input user ID in general information in the storage unit 105. When there is no job information 304 including the user ID matched with the input user ID (NO in step S704), the CPU 101 ends the process during the operation of the linkage source button 201. When there is the job information 304 including user ID matched with the input user ID (YES in step S704), in step S705, the CPU 101 determines the job information 304 to be a linkage target job to be processed in linkage. When there is a plurality of pieces of the job information 304 including the user ID matched with the input user ID, the CPU 101 refers to the job list 303 to determine the head one of the pieces of the job information 304 to be a linkage target job.

Figure 15:
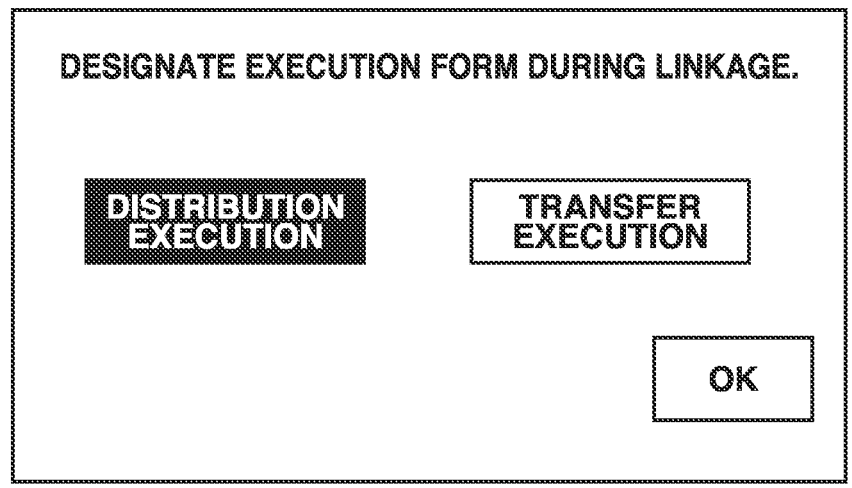
FIG. 15 is a diagram illustrating an example of a linkage form designation screen.

After the determination of the linkage target job, in step S706, the CPU 101 displays a linkage form designation screen on the operation display unit 104. In step S707, the CPU 101 stands by until a linkage form is designated. FIG. 15 is a diagram illustrating an example of the linkage form designation screen. In FIG. 15, two linkage forms can be selected, namely, "Distribution Execution" that distributes jobs to a linkage source and a linkage destination to execute the jobs, and "Transfer Execution" that transfers a job from the linkage source to the linkage destination to execute the job.

When linkage form designation information has been input from the operation display unit 104 (YES in step S707), in step S708, the CPU 101 updates "Linkage Form" of the job information 304 of the linkage target job according to the designation information.

After the job information 304 has been updated, in step S709, the CPU 101 generates a request message to broadcast it to the other proximate image forming apparatuses 2 and 3 via the wireless communication unit 110. After the request message has been broadcasted, in step S710, the CPU 101 updates the following items of the job information 304 of the linkage target job:

"Request ID"="Request ID of Transmitted Request Message"

"Linkage State"="Wait for Linkage Destination Determination"

"Expiration Date (and Time) of Linkage Destination Determination Wait"="After Predetermined Time from Current Time"

As described above, the image forming apparatus 1 broadcasts the request message to the other image forming apparatuses 2 and 3 by operating the linkage source button 201.

Figure 16:
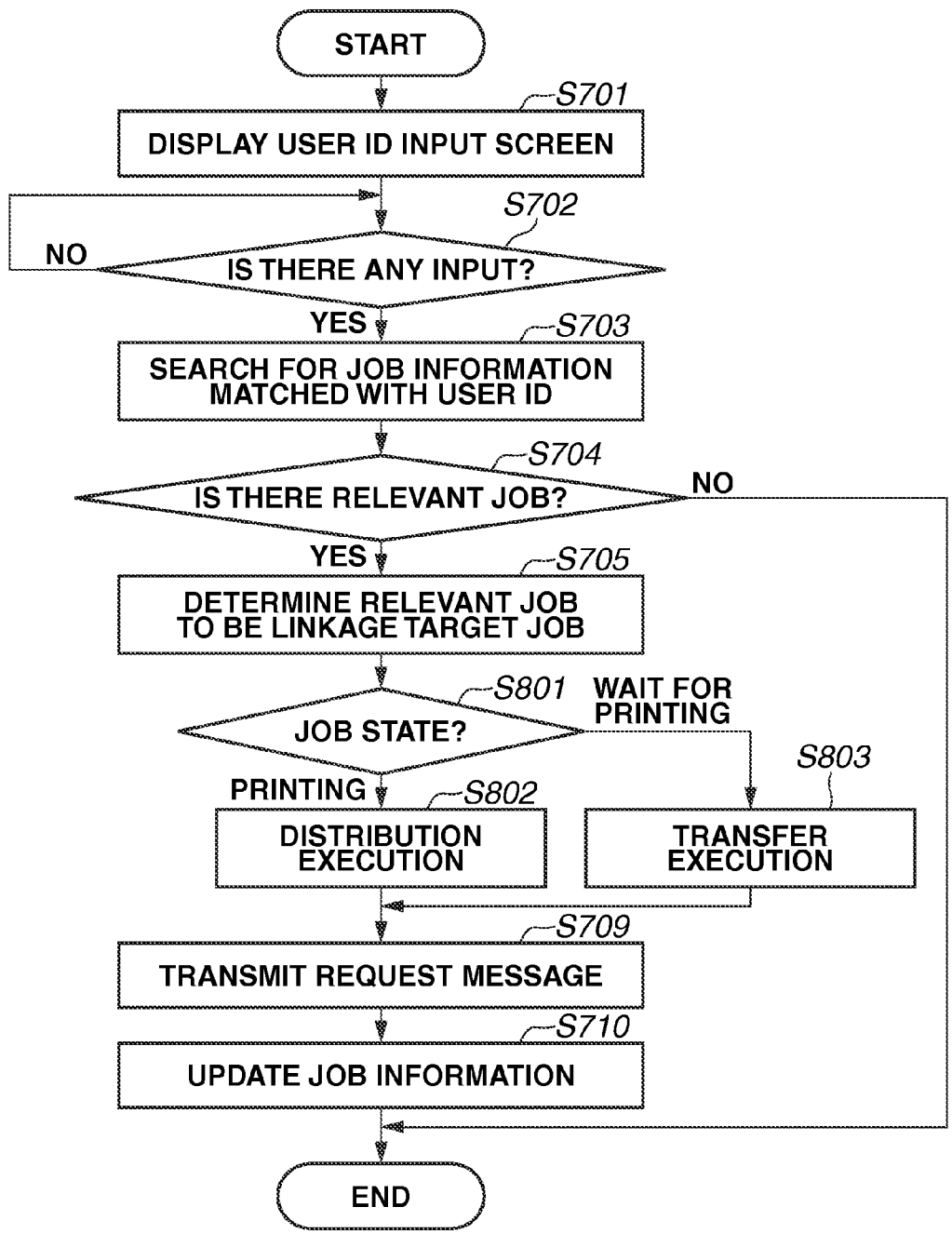
FIG. 16 is a flowchart illustrating a process during the operation of the linkage source button.

In addition to the inputting from the linkage form designation screen by the user, the "Linkage Form" may be automatically determined on the image forming apparatus 1 side according to "Job State" of the linkage target job. The "Job State" indicates whether the job is being executed or waiting. FIG. 16 is a flowchart illustrating such a process. Steps similar to those of the flowchart illustrated in FIG. 13 are denoted by the same reference numerals. Steps S706 to S708 will be described as they are different from those illustrated in FIG. 13.

After the linkage target job has been determined in step S705, in step S801, the CPU 101 checks the "Job State" of the job information 304 of the linkage target job. The CPU 101 determines which of "Printing" and "Wait For Printing" the "Job State" is. When the "Job State" is "Printing" (printing in step S801), in step S802, the CPU 101 determines a linkage form to be distribution execution to update the "Linkage Form" of the job information 304 to "Distribution Execution". When the "Job State" is "Wait For Printing" (wait for printing in step S801), in step S803, the CPU 101 determines a linkage form to be transfer execution to update the "Linkage Form" of the job information 304 to "Transfer Execution". Then, the CPU 101 broadcasts a request message to update the job information 304 of the linkage target job. The linkage form is determined according to the job state. Thus, an optimal linkage form can be determined without any designation from the linkage form designation screen by the user.

<Process During Operation of Linkage Designation Button>

Figure 17:
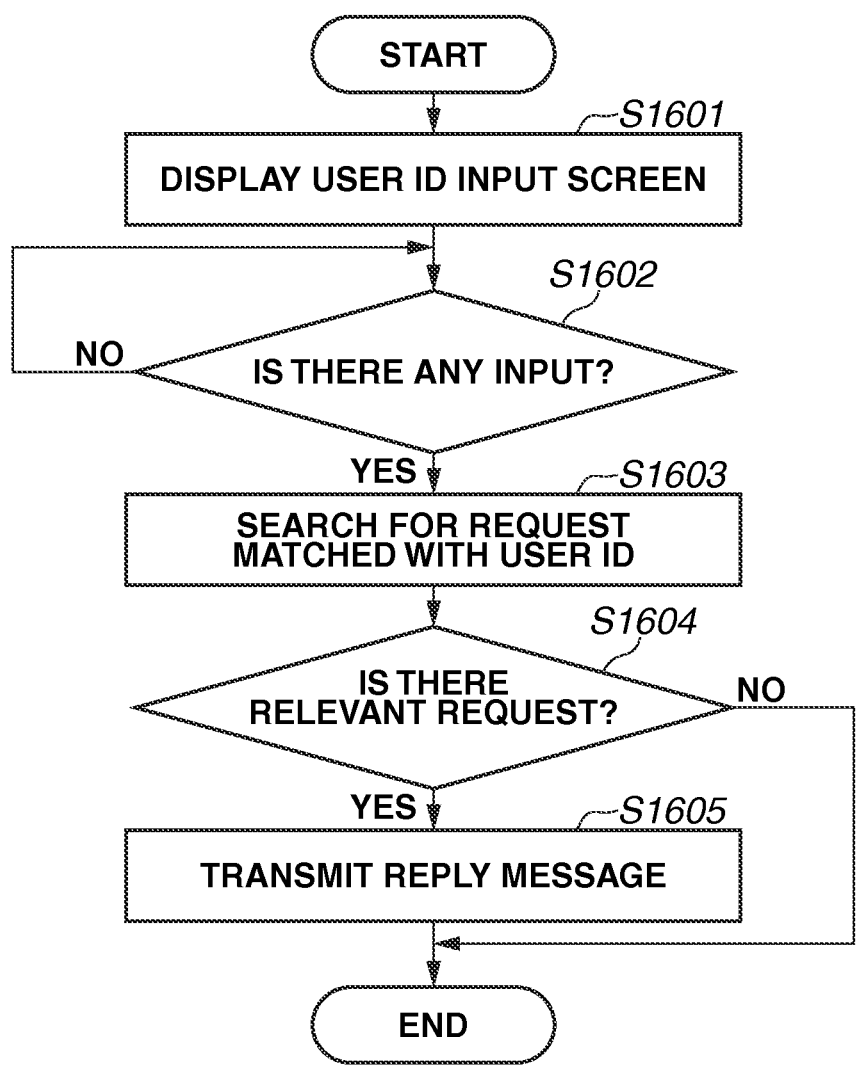
FIG. 17 is a flowchart illustrating a process during an operation of a linkage destination button.

FIG. 17 is a flowchart illustrating a process during the operation of the linkage destination button 202 (step S504 illustrated in FIG. 12). This process is performed by the linkage reception unit 10 of the CPU 101 when the linkage destination button 202 is operated. In the examples illustrated in FIGS. 6 and 11, the CPU 101 of the image forming apparatus 2 performs the process. As illustrated in FIG. 11, in the image forming apparatus 2, this process is performed after the request message has been received from the image forming apparatus 1.

After the linkage destination button 202 has been operated, in step S1601, the CPU 101 displays a user ID input screen on the operation display unit 104 to identify a user who has operated the linkage destination button 202. The operation of the linage destination button 202 is linkage permission by the user. The user ID input screen is similar to the one illustrated in FIG. 14. In step S1602, after the user ID input screen has been displayed, the CPU 101 stands by until a user ID is input.

When the user ID has been input (YES in step S1602), in step S1603, the CPU 101 searches for a request including a user ID matched with the input user ID in the request list 302 of the storage unit 105. When there is no request including a user ID matched with the input user ID (NO in step S1604), the CPU 101 ends the process during the operation of the linkage destination button 202.

When there is a request including a user ID matched with the input user ID (YES in step S1604), in step S1605, the CPU 101 generates a reply message to the image forming apparatus of the linkage source in response to the request. After the reply message has been generated, in step S1605, the CPU 101 transmits the reply message to the image forming apparatus 1 of the linkage source via the wireless communication unit 110.

As described above, the image forming apparatus 2 transmits the reply message to the image forming apparatus 1 of the linkage source by operating the linkage destination button 202.

<Process During Reception of Message>

Figure 18:
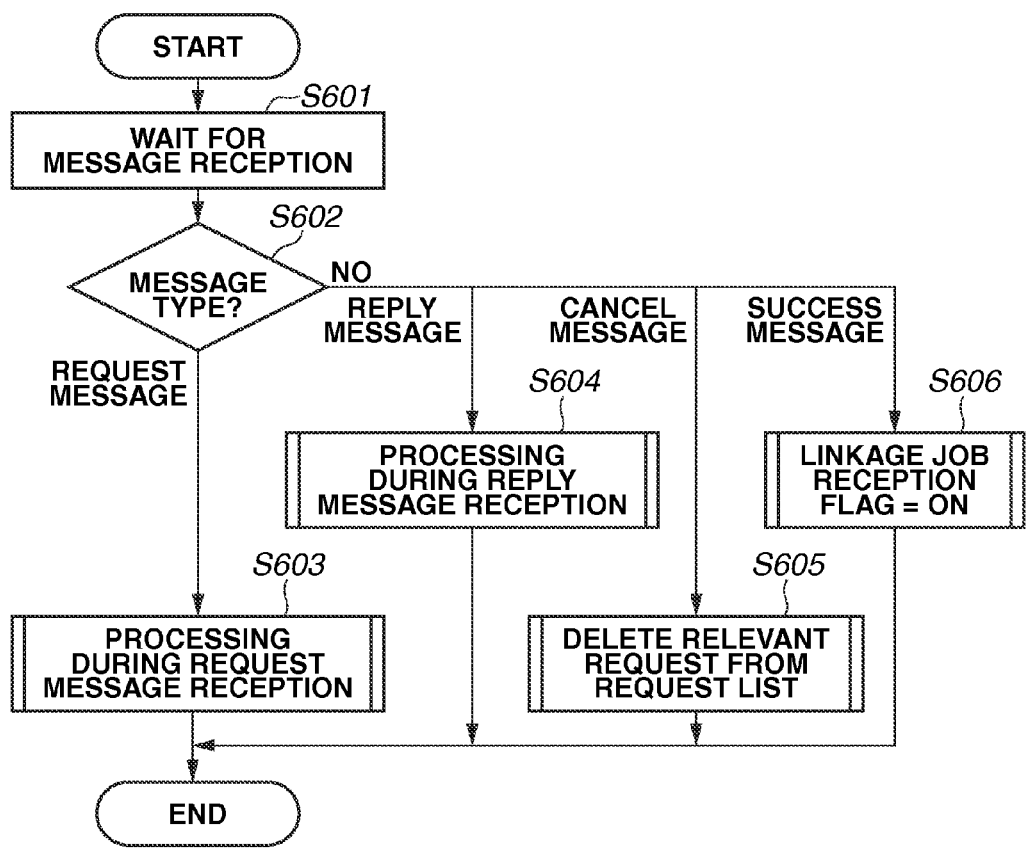
FIG. 18 is a flowchart illustrating a process during reception of a message.

A process of the image forming apparatus during reception of various messages will be described. As described above referring to FIG. 6, during the linkage establishment, the request message, the reply message, the cancel message, and the success message are received/transmitted between the image forming apparatuses 1 and 2. FIG. 18 is a flowchart illustrating processes of the image forming apparatuses 1 to 3 during reception of the messages. The processes are performed by the CPU 101 via the message reception unit 20.

In step S601, the CPU 101 waits for reception of messages from the other image forming apparatuses via the wireless communication unit 110. In step S602, when a message has been received, the CPU 101 determines its type. According to the type of the received message, the CPU 101 performs a process during reception of a request message (S603), a process during reception of a reply message (S604), a process during reception of a cancel message (S605), or a process during reception of a success message (S606). The process during reception of the request message and the process during reception of the reply message will be described in detail below.

In step S605, the CPU 101, which has received the cancel message, deletes a request matched with a request ID included in the cancel message by the message reception unit 20. In the examples illustrated in FIGS. 6 and 11, the CPU 101 of each of the image forming apparatuses 2 and 3 performs this process.

In step S606, the CPU 101, which has received the success message, sets a linkage job reception flag ON by the message reception unit 20. The linkage job reception flag is a flag linked with the image forming apparatus of the linkage destination to indicate that a job can be received. In the examples illustrated in FIGS. 6 and 11, the CPU 101 of the image forming apparatus 2 performs this process. Accordingly, the job to be processed in linkage can be received.

<Process During Reception of Request Message: S603 Illustrated in FIG. 18>

Figure 19:
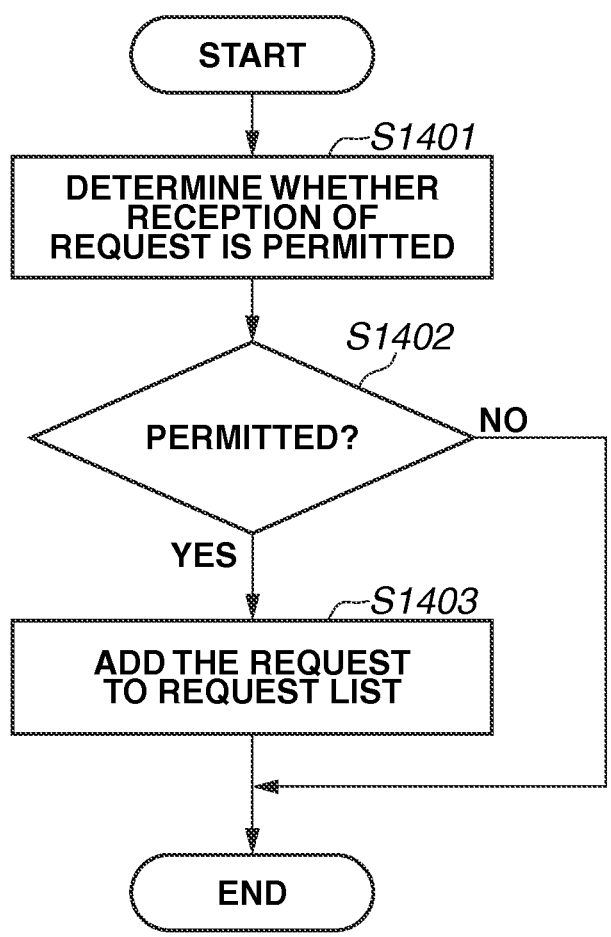
FIG. 19 is a flowchart illustrating a process during reception of a request message.

FIG. 19 is a flowchart illustrating the process during reception of the request message. This process is performed by the message reception unit 20 before request messages are received from the other image forming apparatuses to operate the linkage destination button 202. In the examples illustrated in FIGS. 6 and 11, the CPU 101 of each of the image forming apparatuses 2 and 3 performs this process.

After reception of a request message broadcasted by the wireless communication unit 110 from the image forming apparatus 1, the CPU 101 checks its content. In step S1401, the CPU 101 determines whether a request can be received based on a content checking result. For example, the CPU 101 checks "Job Type" of the request message to determine whether a job is receivable.

When the request cannot be received (NO in step S1402), the CPU 101 ends the process. When the request can be received (YES in step S1402), in step S1403, the CPU 101 adds the request to the request list 302 of the request storage unit 105 to end the process.

Performing this process before the linkage destination button 202 is operated enables searching in the latest request list 302 in step S1603 of the process during the operation of the linkage destination button 202.

<Process During Reception of Reply Message: S604 Illustrated in FIG. 18>

Figure 20:
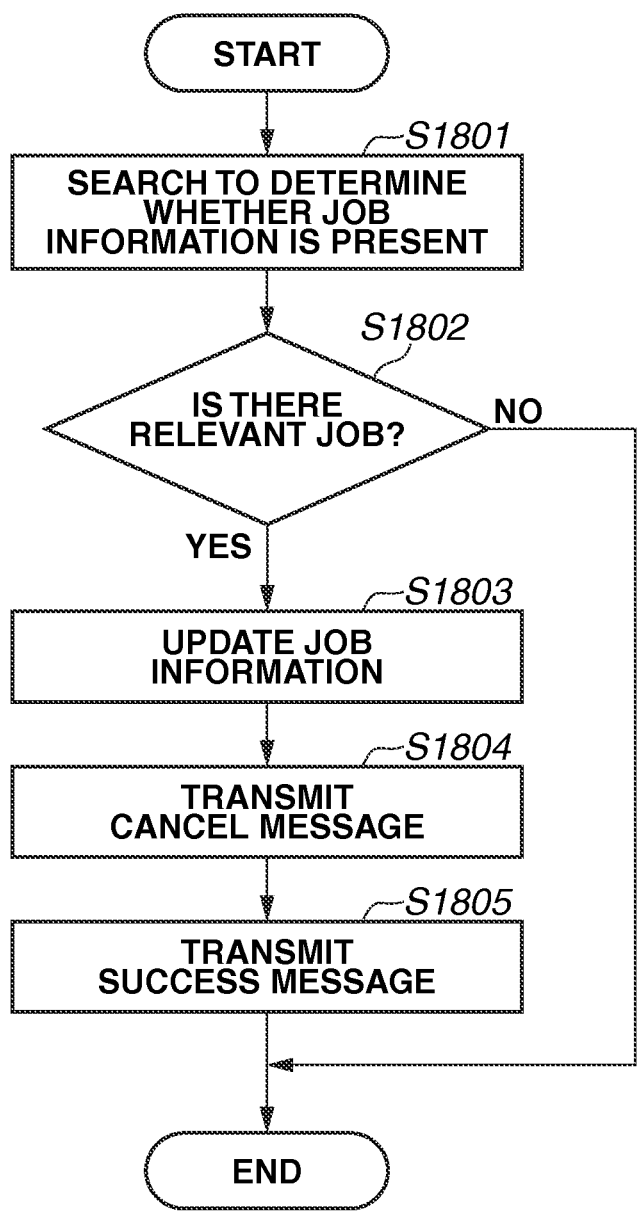
FIG. 20 is a flowchart illustrating a process during reception of a reply message.

FIG. 20 is a flowchart illustrating the process during reception of the reply message. The CPU 101 performs the process by the message reception unit 20. In the examples illustrated in FIGS. 6 and 11, the CPU 101 of the image forming apparatus 1 performs this process.

After reception of the reply message, in step S1801, the CPU 101 searches for job information 304 indicating that "Linkage State" is "Wait for Linkage Destination Determination" and "Request ID" matches a request ID included in the reply message. When the job information 304 is not present (NO in step S1802), the CPU 101 ends the reception process of the reply message.

When the job information 304 is present (YES in step S1802), in step S1803, the CPU 101 updates the following items of the job information 304:

"Linkage Destination Device ID"="Reply Message Linkage Destination Device ID"
"Linkage State"="Linkage Destination Determined"

After the job information 304 has been updated, in step S1804, the CPU 101 generates a cancel message for canceling the linkage request, and broadcasts the cancel message to the other proximate image forming apparatuses 2 and 3 via the wireless communication unit 110. After the cancel message has been broadcasted, in step S1805, the CPU 101 generates a success message giving notice of establishment of linkage, and transmits the success message to the image forming apparatus 2 of the linkage destination via the wireless communication unit 110. The image forming apparatus 2 of the linkage destination receives the success message to execute step S606 illustrated in FIG. 18. Through this process, linkage is established between the image forming apparatus 1 of the linkage source and the image forming apparatus 2 of the linkage destination.

<Transfer of Linkage Job Data>

Figure 21:
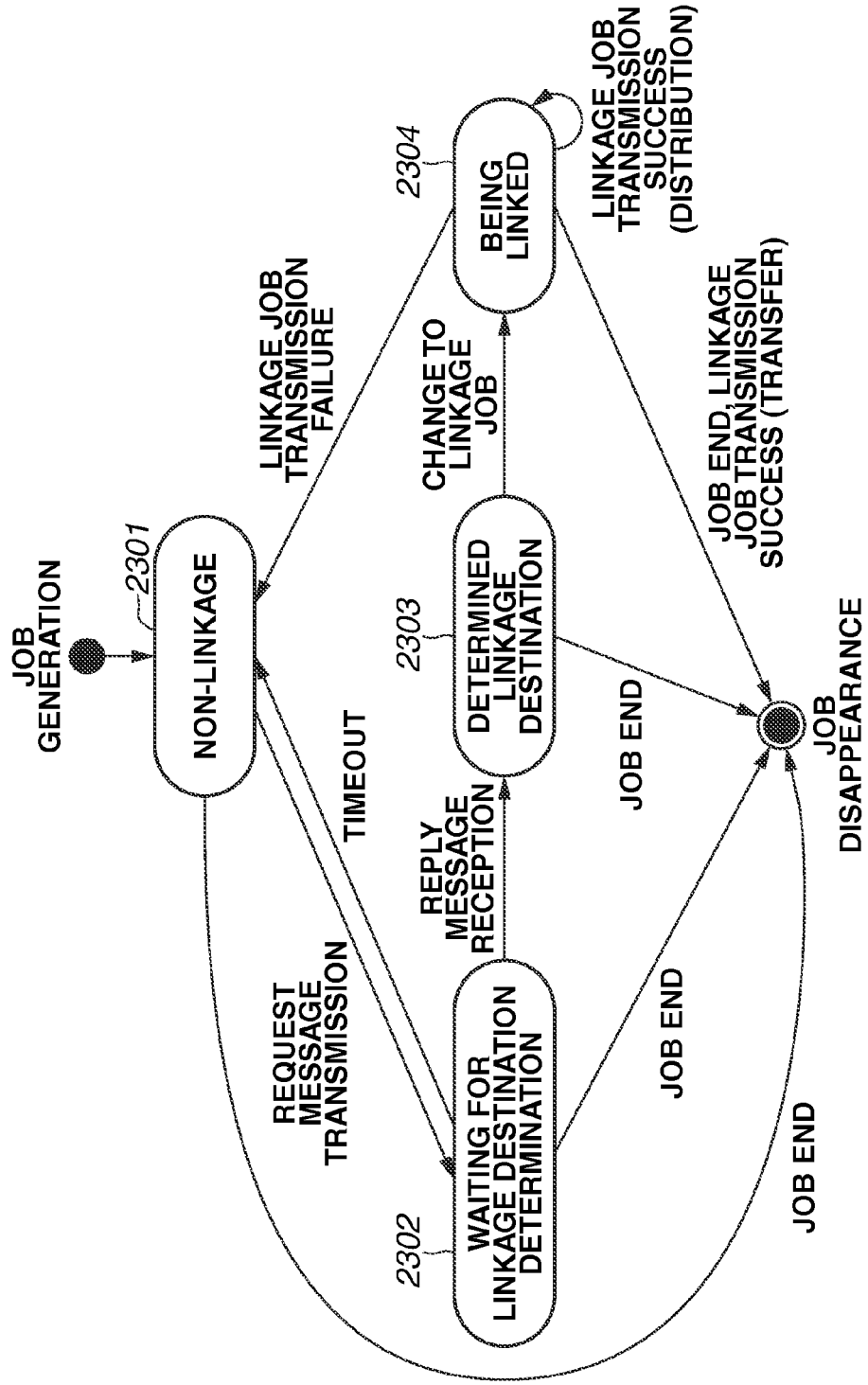
FIG. 21 is a transition diagram illustrating a job linkage state.

FIG. 21 is a transition diagram illustrating "Linkage State" of a job. The "Linkage State" of a job includes non-linkage 2301, waiting for linkage destination determination 2302, determined linkage destination 2303, and being linked 2304.

The non-linkage 2301 indicates that the job is not in a linked state, and this state is maintained from job generation to determination of a linkage target job. The waiting for linkage destination determination 2302 indicates a state until the job is determined to be a linkage target job and a request message is transmitted to determine a linkage destination. When no reply message is received even after a passage of predetermined time in the state of the waiting for linkage destination determination 2302, the linkage state returns to the non-linkage 2301.

The determined linkage destination 2303 indicates a state where a reply message has been received to determine a linkage destination. The being linked 2304 indicates a linked state after completion of switching to a linkage job. When transmission of the linkage job fails in the state of being linked 2304, the linkage state returns to the non-linkage 2301. The job disappears after the end of the job.

Figure 22:
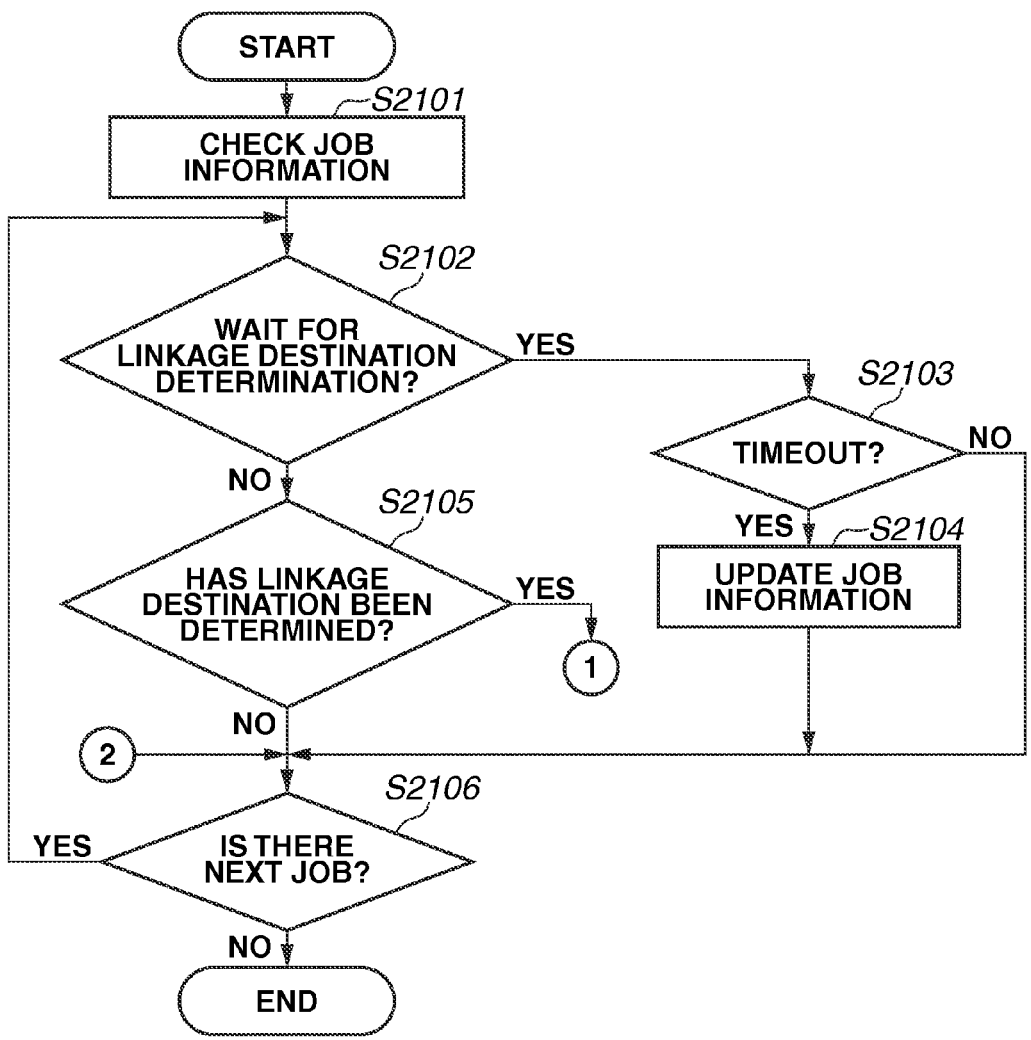
FIG. 22 is a flowchart illustrating processing for switching to a linkage job.
Figure 23:
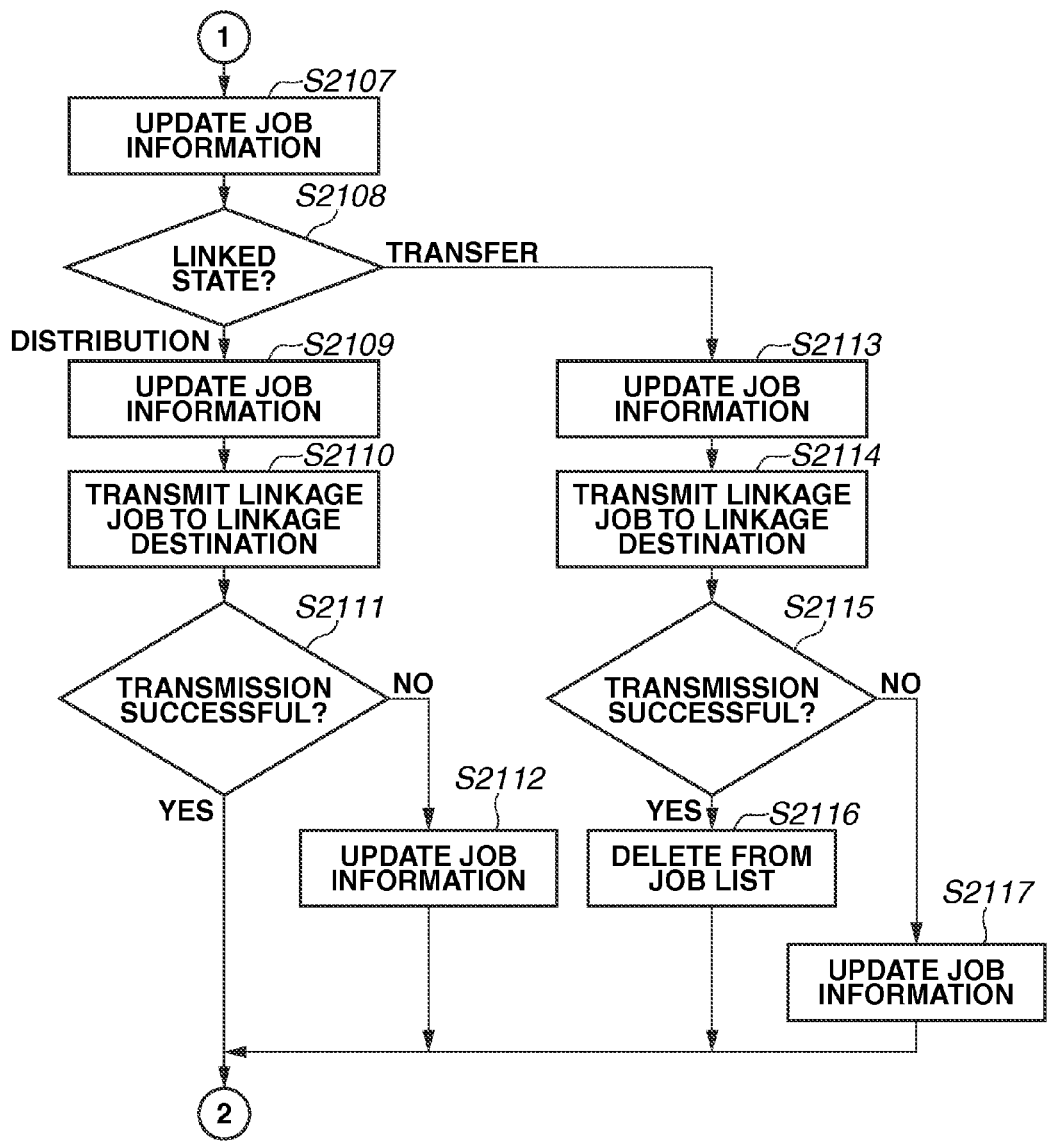
FIG. 23 is a flowchart illustrating processing for switching to the linkage job.

After the linkage has been established, the image forming apparatus 1 of the linkage source switches the linkage target job to a linkage job to transmit it to the image forming apparatus 2 of the linkage destination. FIGS. 22 and 23 are flowcharts each illustrating a switching process to the linkage job. The CPU 101 performs the process by the linkage job switching unit 30. The linkage job switching unit 30 monitors "Linkage State" of each job based on the job information 304, and performs the switching process to the linkage job when there is a job having a linkage state set to the linkage destination determination 2302 or the determined linkage destination 2303.

In step S2101, the CPU 101 checks the job information 304 in order from a head job of the job list 303. In step S2102 or S2105, the CPU 101 checks the job information 304 indicating that "Linkage State" is the waiting for linkage destination determination 2302 or the determined linkage destination 2303.

When "Linkage State" is the waiting for linkage destination determination 2302 (YES in step S2102), the CPU 101 checks "Expiration Date (and Time) of Waiting for Linkage Destination Determination" of the job information 304. The "Expiration Date (and Time) of Waiting for Linkage Destination Determination" indicates a time limit of linkage destination determination. Passing the time limit, the CPU 101 determines timeout (YES in step S2103). When timeout is determined (YES in step S2103), in step S2104, the CPU 101 updates "Linkage State" of the job information 304 to the non-linkage 2301. When timeout is not determined (NO in step S2103), in step S2106, the CPU 101 checks presence of a next job in the job list 303. When there is a next job (YES in step S2106), the CPU 101 returns to step S2102 to repeat the process. When there is no more job (NO in step S2106), the CPU 101 ends the process.

When "Linkage State" is not the waiting for linkage destination determination 2302 (NO in step S2102), in step S2105, the CPU 101 checks whether "Linkage State" is the determined linkage destination 2303. When "Linkage State" is not the determined linkage destination 2303 (NO in step S2105), in step S2106, the CPU 101 checks presence of a next job in the job list 303. When there is a next job (YES in step S2106), the CPU 101 returns to step S2102 to repeat the process. When there is no more job (NO in step S2106), the CPU 101 ends the process.

When "Linkage State" is the determined linkage destination 2303 (YES in step S2105), the CPU 101 changes to a process illustrated in FIG. 23 to update "Linkage State" of the job information 304 to the being linked 2304 in step S2107. After the "Linkage State" has been updated, in step S2108, the CPU 101 checks which of "Distribution execution" and "Transfer Execution" the "Linkage State" of the job information 304 is. An example of changing distribution of a number of copies to be printed between the linkage destination and the linkage source depending on which of "Distribution execution" and "Transfer Execution" the "Linkage State" is will be described.

When the "Linkage State" is "Distribution Execution" (distribution in S2108), the CPU 101 sets a number of copies (n) calculated by multiplying "Number of Unoutput Copies (N1)" of the job information 304 with a predetermined rate to "Number of Linkage Destination Copies (N2)". In step S2109, the CPU 101 reduces the "Number of Unoutput Copies (N1)" by a number equal to that set to the "Number of Linkage Destination Copies (N2)" to update the job information.

After the job information 304 has been updated, in step S2110, the CPU 101 transmits a linkage job to the image forming apparatus of the linkage destination. Accordingly, in step S2110, the CPU 101 transmits image data 305 of the job stored in the storage unit 105 to the image forming apparatus 2 indicated by "Linkage Destination Device ID" of the job information 304 via the network communication unit 109. When the transmission of the linkage job fails (NO in step S2111), in step S2112, the CPU 101 updates the job information 304 as follows:

"Number of Unoutput Copies (N1)"="Original Number of Copies (N1+N2)"
"Number of Linkage Destination Copies (N2)"="0"
"Linkage Stage"="Non-linkage"

When the "Linkage State" is "Transfer Execution" (transfer in S2108), in step S2113, the CPU 101 sets a number of copies of "Number of Unoutput Copies (N1)" in "Number of Linkage Destination Copies (N2)" of the job information, and sets the Number of Unoutput Copies (N1) to "0". After the job information 304 has been updated, in step S2114, the CPU 101 transmits a linkage job to the image forming apparatus of the linkage destination as in the case of step S2110. When the transmission of the linkage job fails (NO in step S2115), in step S2117, the CPU 101 updates the job information 304 as follows:

"Number of Unoutput Copies (N1)"="Original Number of Copies (N2)"
"Number of Linkage Destination Copies (N2)"="0" "Linkage Stage"="Non-linkage"

When the transmission of the linkage job succeeds (YES in step S2115), in step S2116, since the job of the linkage source has been transferred to the linkage destination, the CPU 101 deletes the job from the job list 303 of the image forming apparatus 1 of the linkage source, and further deletes the relevant job information 304.

When the transmission has been successful (YES in step S2111), when the job information 304 has been updated (step S2112 or S2117) or when the job has been deleted (step S2116), the CPU 101 changes to step S2106 illustrated in FIG. 22. When there is a next job (YES in step S2106), the CPU 101 returns to step S2102 to repeat the process. When there is no more job (NO in step S2106), the CPU 101 ends the process.

After the linkage job has thus been transmitted from the image forming apparatus 1 of the linkage source, the image forming apparatus 2 of the linkage destination performs the following process.

Figure 24:
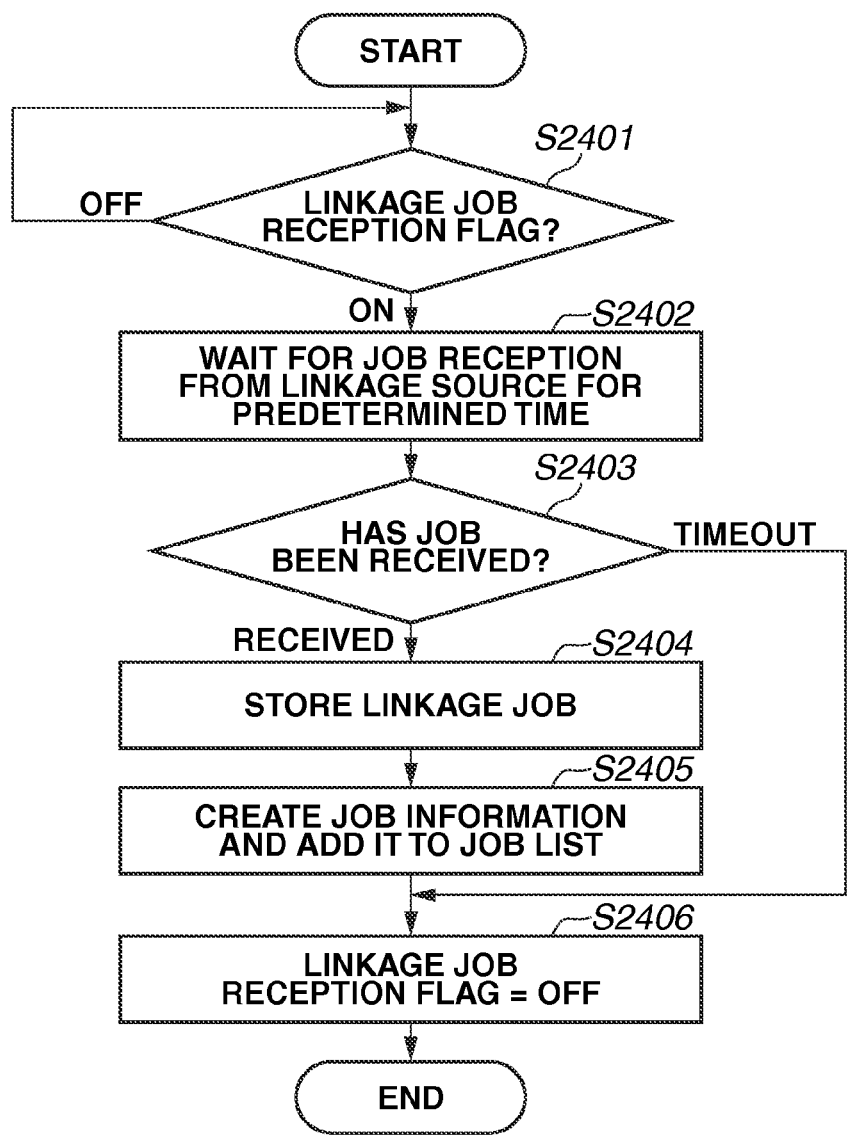
FIG. 24 is a flowchart illustrating a process during reception of a linkage job.

FIG. 24 is a flowchart illustrating a process performed by the image forming apparatus 2 of the linkage destination during reception of a linkage job. The CPU 101 performs the process by the linkage job reception unit 40.

The CPU 101 monitors the linkage job reception flag that is to be set ON after reception of the success message. When the flag is ON (On in step S2401), in step S2402, the CPU 101 waits for a predetermined period until a linkage job is received from the image forming apparatus 1 of the linkage source. When no linkage job is received within the predetermined period (timeout in step S2403), in step S2406, the CPU 101 sets the linkage job reception flag OFF to end the process concerning the linkage.

When a linkage job is received within the predetermined period (received in step S2403), in step S2404, the CPU 101 stores the received linkage job (image data) in the storage unit 105. In step S2405, after the linkage job has been stored, the CPU 101 cerates the job information 304 about the received linkage job to add it to the job list 303. Then, in step S2406, the CPU 101 sets the linkage job reception flag OFF to end the process concerning the linkage. The linkage job added to the job list 303 is separately processed by the CPU 101, and used for image forming processing by the printer unit 108. Alternatively, after the linkage job reception flag has been set OFF, the CPU 101 may return to step S2401 to continue monitoring of the linkage job reception flag.

As described above, both the image forming apparatus 1 of the linkage source and the image forming apparatus 2 of the linkage destination require an input of a user ID when establishing linkage. Thus, the user requesting linkage can be checked, and erroneous establishment of linkage between the image forming apparatuses 1 and 2 can be prevented.

In the first exemplary embodiment, the user who has operated the linkage source button 201 and the linkage destination button 202 is identified by inputting the user ID on the user ID input screen illustrated in FIG. 14 by the user. In a second exemplary embodiment, the image forming apparatuses 1 to 3 include log-in processing units for performing user's logging-in. User's logging into the image forming apparatuses 1 to 3 eliminates the necessity of checking the user when linkage is established in the first exemplary embodiment.

The image forming apparatus of the second exemplary embodiment is different from that of the first exemplary embodiment in that a user ID and a password of a user permitted to log into the image forming apparatus are stored beforehand as registered user information in the storage unit 105, and other components are similar.

Figure 25:
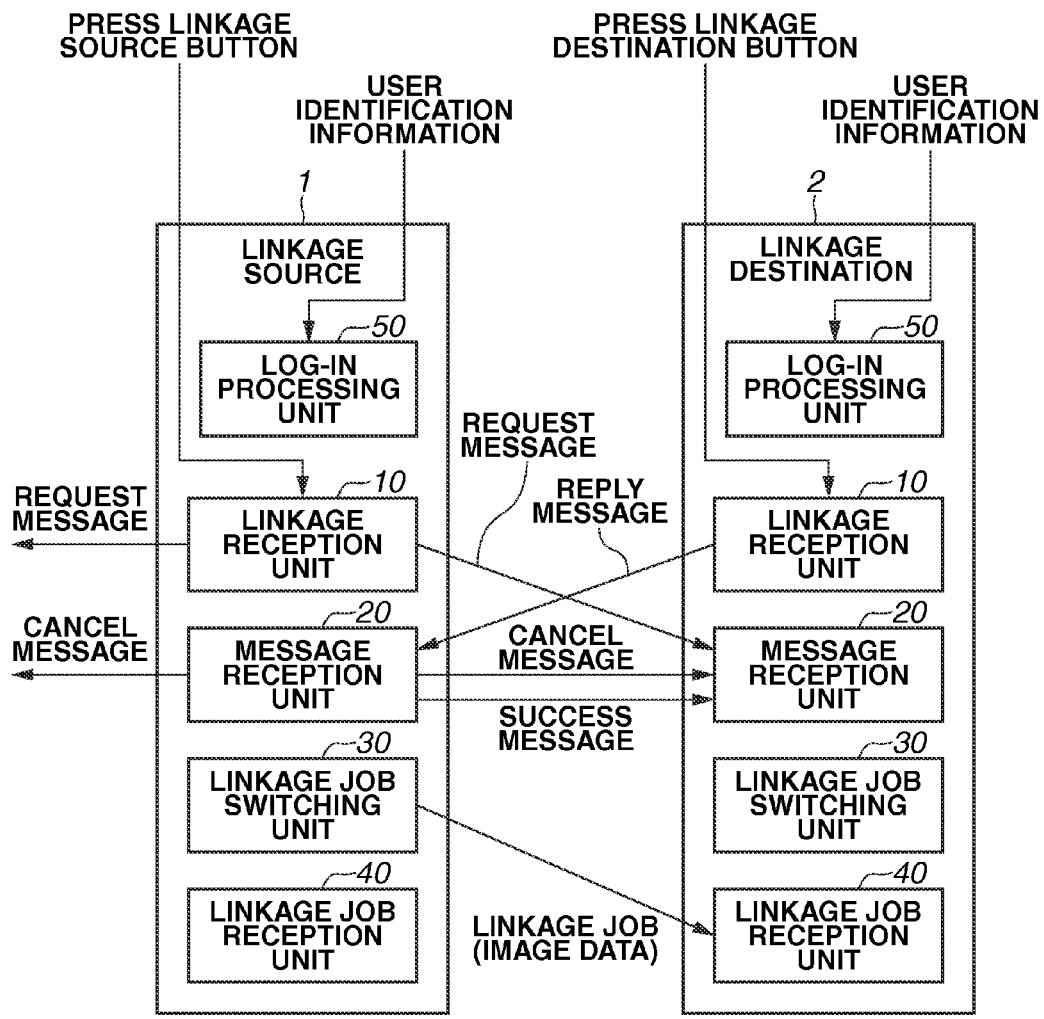
FIG. 25 is a functional block diagram illustrating an image forming apparatus.

FIG. 25 is a functional block diagram illustrating the image forming apparatuses 1 and 2 according to the second exemplary embodiment. Each functional block is formed in the image forming apparatus by executing a computer program stored in the ROM 102 by the CPU 101. Different from the functional blocks of the first exemplary embodiment illustrated in FIG. 6, a log-in processing unit 50 is included, and other functional blocks are similar. Description of the other functional blocks will be omitted.

Figure 26:
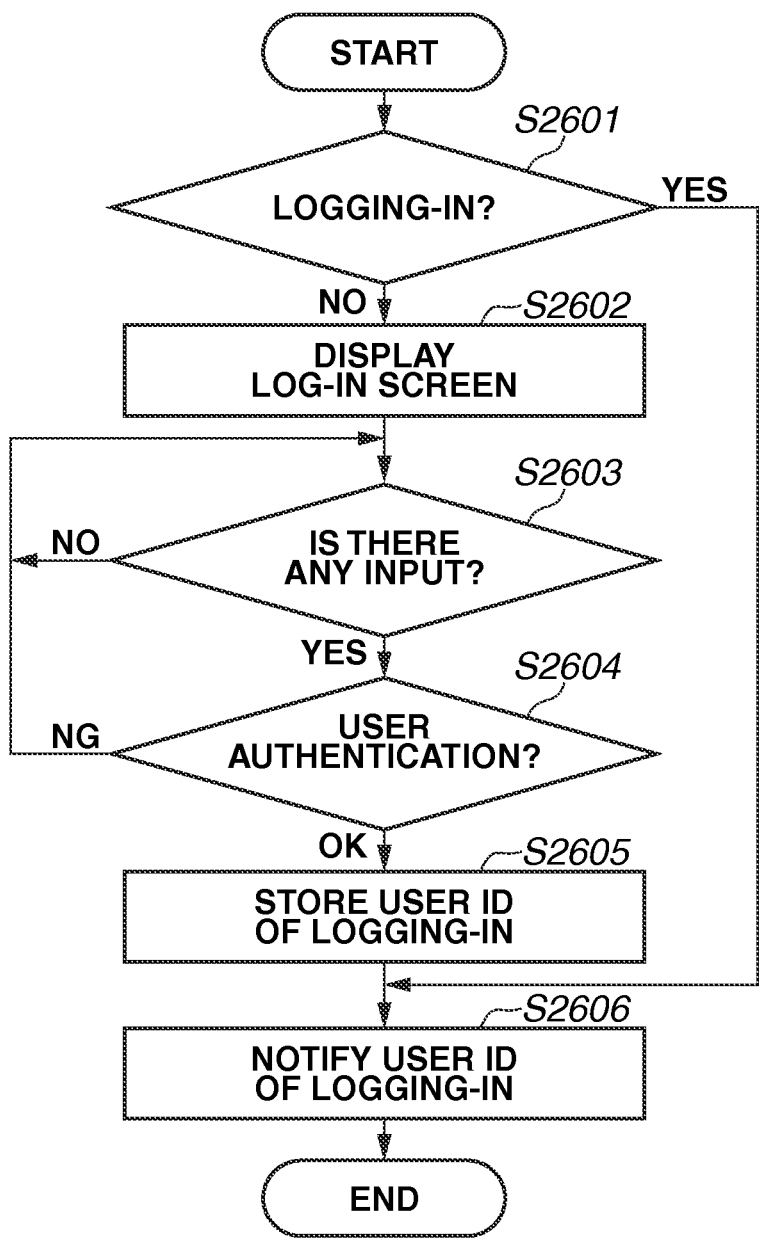
FIG. 26 is a flowchart illustrating log-in processing.

The log-in processing unit 50 acquires user identification information (a user ID and a password) from the operation display unit 104, and performs log-in processing based on the acquired user identification information. FIG. 26 is a flowchart illustrating the log-in processing performed by the log-in processing unit 50. Such processing is executed when a user operates the linkage source button 201 or the linkage destination button 202.

In step S2601, the CPU 101 checks whether the user is logging in when the linkage source button 201 or the linkage destination button 202 is operated. When the user is logging in (YES in step S2601), in step S2606, the log-in processing unit 50 notifies the linkage reception unit 10 of a user ID of the user who is logging in to end the processing.

Figure 27:
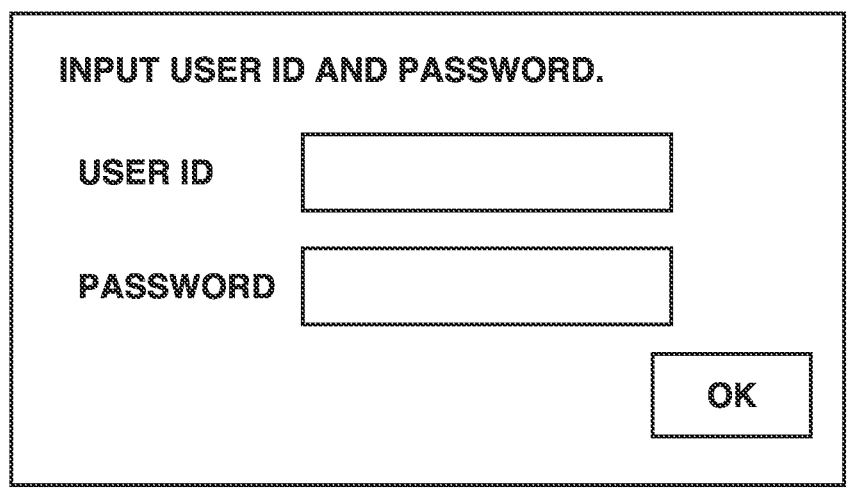
FIG. 27 is a diagram illustrating an example of a log-in screen.

When there is no user who is logging in (NO in step S2601), in step S2602, the CPU 101 displays a log-in screen used for the user to log in. In step S2603, after the log-in screen has been displayed, the CPU 101 waits until a user ID and a password are input. FIG. 27 is a diagram illustrating an example of the log-in screen. The user inputs the user ID and the password by an input device such as a keyboard of the operation display unit 104. When the user presses an "OK" button after the user ID and the password have been input, the user ID and the password that have been input are transmitted from the operation display unit 104 to the CPU 101.

When the user ID and the password have been received from the operation display unit 104 (YES in step S2603), in step S2604, the CPU 101 associates the user ID and the password that have been received with registered user information to perform user authentication. When the user authentication is successful (OK in step S2604), in step S2605, the CPU 101 temporarily stores the user ID as a user ID of the user who is logging-in in the RAM 103. In step S2606, the CPU 101 notifies the linkage reception unit 10 of the user ID temporarily stored in the RAM 103 to end the processing.

Figure 28:
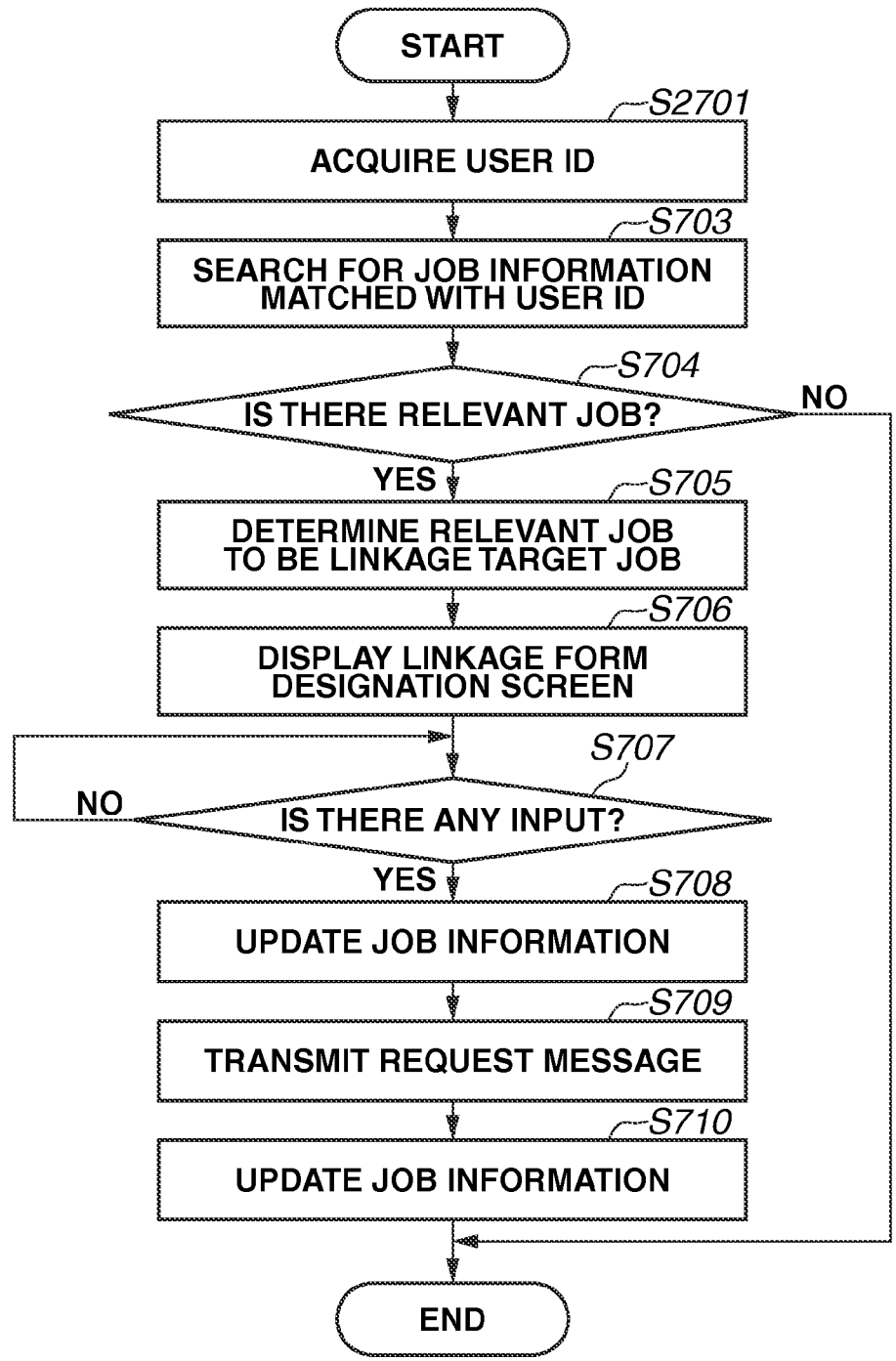
FIG. 28 is a flowchart illustrating a process during an operation of the linkage source button.

FIG. 28 is a flowchart illustrating a process during an operation of the linkage source button 201 according to the second exemplary embodiment. Steps similar to those of the flowchart of the first embodiment illustrated in FIG. 13 are denoted by the similar step numbers. Such processing is executed by the linkage reception unit 10 of the CPU 101 when the linkage destination button 202 is operated.

When the linkage source button 201 is operated, in step S2701, the CPU 101 acquires the user ID of the user who is logging-in from the log-in processing unit 50. The log-in processing unit 50 transmits the user ID to the CPU 101 by executing the processing illustrated in FIG. 26. In step S703, the CPU 101 searches for job information based on the user ID acquired from the log-in processing unit 50. Processing thereafter is similar to that of the first exemplary embodiment illustrated in FIG. 13, and thus description thereof will be omitted.

Figure 29:
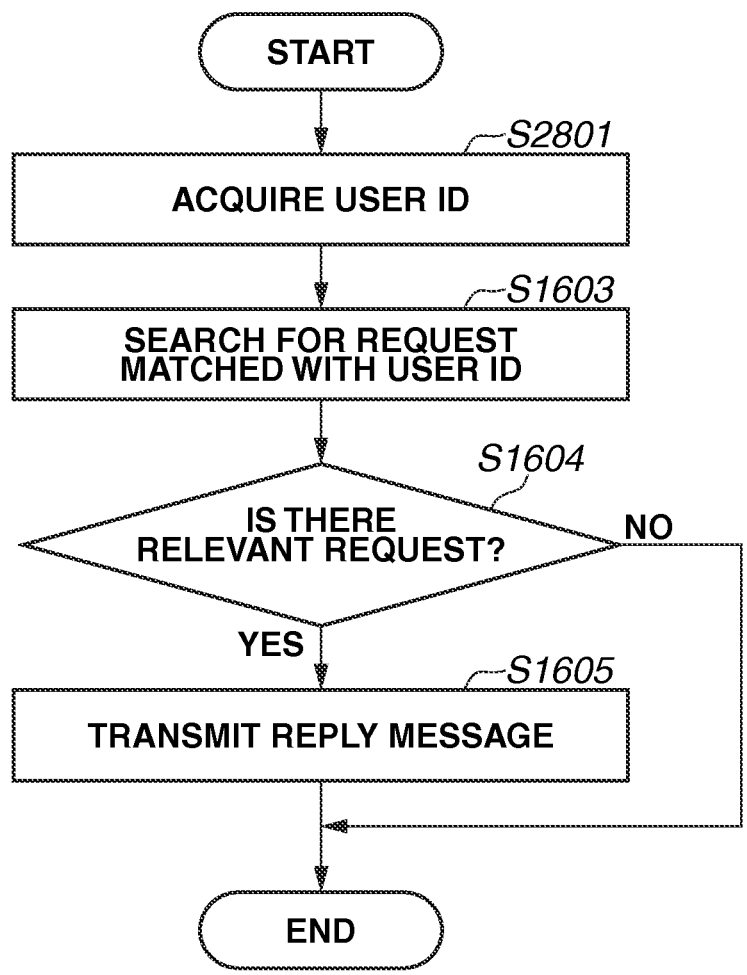
FIG. 29 is a flowchart illustrating a process during an operation of the linkage destination button.

FIG. 29 is a flowchart illustrating a process during an operation of the linkage destination button 202 according to the second exemplary embodiment. Steps similar to those of the flowchart of the first embodiment illustrated in FIG. 17 are denoted by the similar step numbers. Such processing is executed by the linkage reception unit 10 of the CPU 101 when the linkage destination button 202 is operated.

When the linkage destination button 202 is operated, in step S2801, the CPU 101 acquires the user ID of the user who is logging-in from the log-in processing unit 50. The log-in processing unit 50 transmits the user ID to the CPU 101 by executing the processing illustrated in FIG. 26. In step S1603, the CPU 101 searches for a request based on the user ID acquired from the log-in processing unit 50. Processing thereafter is similar to that of the first exemplary embodiment illustrated in FIG. 17, and thus description thereof will be omitted.

As described above, in the second exemplary embodiment, when the user has been logging in at the time of operating the linkage source button 201 or the linkage destination button 202, the user is not requested to input the user ID. Thus, an image forming apparatus having high operability in addition to the effects of the first exemplary embodiment can be provided.

In the first and second exemplary embodiments, the linkage target job is a job at the head of the job list 303 among the relevant jobs (step S705 illustrated in FIG. 13, and step S705 illustrated in FIG. 28). According to a third exemplary embodiment, a linkage target job is determined by user's selection. A hardware configuration and functional blocks of an image forming apparatus according to the third exemplary embodiment are similar to those of the second exemplary embodiment. Thus, description of the hardware configuration and the functional blocks of the image forming apparatus according to the third exemplary embodiment will be omitted.

Figure 30:
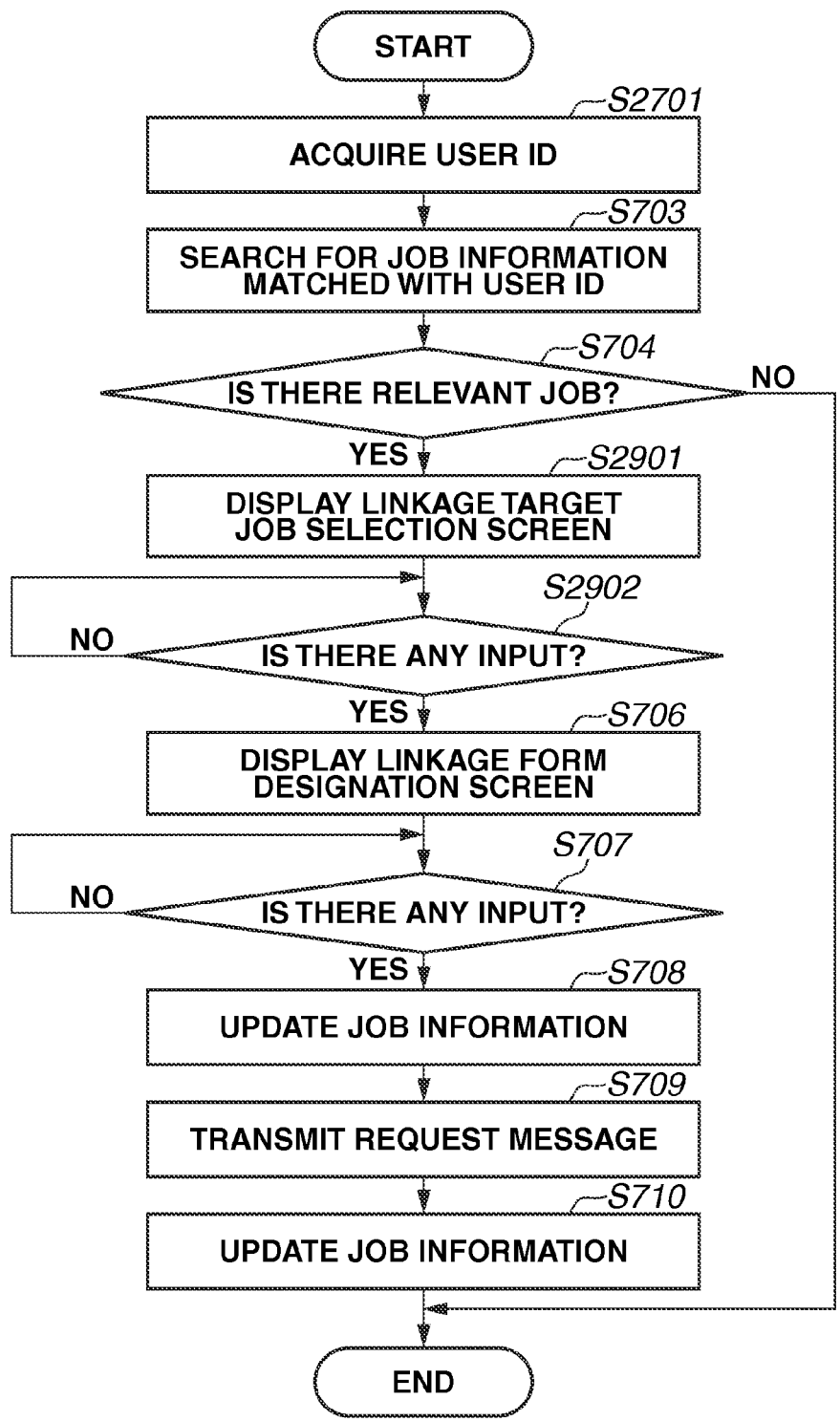
FIG. 30 is a flowchart illustrating a process during the operation of the linkage source button.

FIG. 30 is a flowchart illustrating a process during an operation of the linkage source button 201 according to the third exemplary embodiment. Steps similar to those of the flowchart of the second exemplary embodiment illustrated in FIG. 28 are denoted by the similar step numbers. This process is executed by the linkage reception unit 10 of the CPU 101 when the linkage destination button 202 is operated.

The process of steps S2701 to S704 is similar to that of the second exemplary embodiment. When there is job information 304 of a user who has operated the linkage source button 201 in the job list 303 (YES in step S704), in step S2901, the CPU 101 displays a linkage target job selection screen for selecting a linkage target job on the operation display unit 104. In step S2902, the CPU 101 waits until a job is selected after the linkage target job selection screen has been displayed.

FIG. 31 is a diagram illustrating an example of a linkage target job selection screen 3001. On the linkage target job selection screen 3001, a list of the job information 304 of the jobs of the user who has operated the linkage source button 201 is displayed, and the user selects a linkage target job. The user selects a job that is a linkage target of the operation display unit 104 on the linkage target job selection screen 3001 to press an "OK" button. Accordingly, the CPU 101 acquires a selection result from the operation display unit 104 to determine the linkage target job. Processing thereafter is similar to that of the second exemplary embodiment illustrated in FIG. 28, and thus description thereof will be omitted.

Thus, according to the third exemplary embodiment, the user can select the linkage target job. This enables the user to process a desired job in linkage.

In the first to third exemplary embodiments, the linkage form is determined in the image forming apparatus 1 of the linkage source (step S708 illustrated in FIG. 13, and steps S802 and S803 illustrated in FIG. 16). According to a fourth exemplary embodiment, a linkage form is determined in the image forming apparatus 2 of the linkage destination. A hardware configuration and functional blocks of an image forming apparatus according to the fourth exemplary embodiment are similar to those of the second exemplary embodiment. Thus, description of the hardware configuration and the functional blocks of the image forming apparatus according to the fourth exemplary embodiment will be omitted.

When a linkage form is determined in the image forming apparatus 2 of the linkage destination, the image forming apparatus 1 of the linkage source broadcasts a request message including linkage state information indicating a linkage form determined in the image forming apparatus 1 of the linkage source. FIG. 32 is a diagram illustrating such a request message.

Figure 33:
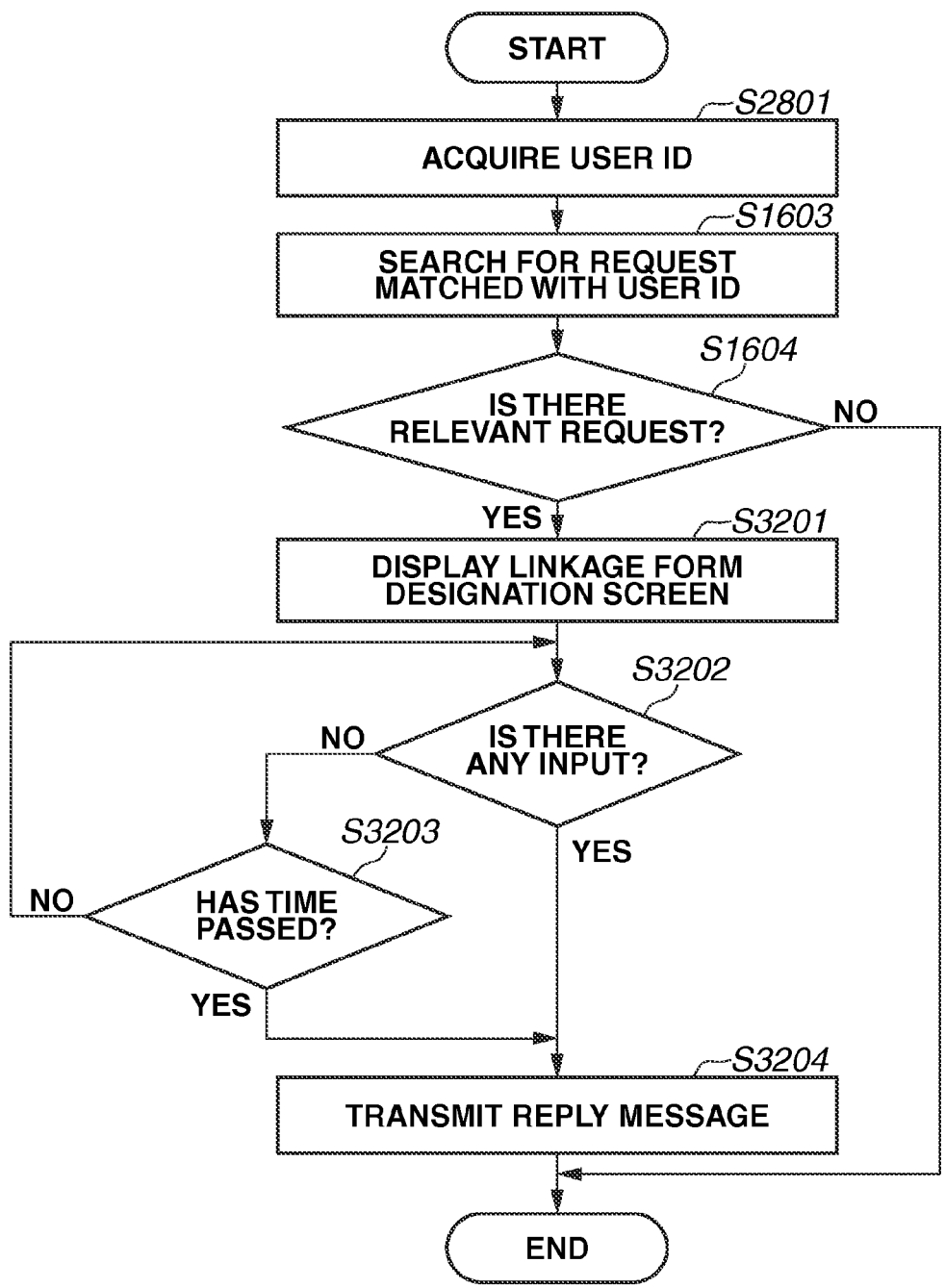
FIG. 33 is a flowchart illustrating a process during the operation of the linkage destination button.

FIG. 33 is a flowchart illustrating a process during an operation of the linkage destination button 202 according to the fourth exemplary embodiment. Steps similar to those of the flowchart of the second exemplary embodiment illustrated in FIG. 29 are denoted by the similar step numbers. This process is executed by the linkage reception unit 10 of the CPU 101 when the linkage destination button 202 is operated.

The process of steps S2801 to S1604 is similar to that of the second exemplary embodiment. When there is a request of a user who has operated the linkage destination button 202 in the request list 302 (YES in step S1604), in step S3201, the CPU 101 displays a linkage form destination screen for designating a linkage form on the operation display unit 104. Even when a linkage form has been determined in the image forming apparatus 1 of the linkage source, on the linkage form display screen, the linkage form can be changed from the information forming apparatus of the linkage destination.

The linkage form display screen is similar to that of the first exemplary embodiment illustrated in FIG. 15. However, in the information forming apparatus 2 of the linkage destination, the linkage form display screen is displayed in a selected state of a linkage form set in a request message received from the image forming apparatus 1 of the linkage source. When changing the linkage form determined in the image forming apparatus 1 of the linkage source, the user changes the linkage form on the linkage form destination screen.

In step S3202, the CPU 101 waits until a linkage form is designated on the linkage form destination screen. After a linkage form has been designated (YES in step S3202), in step S3204, the CPU 101 generates a reply message to transmit it to the image forming apparatus 1 of the linkage source. In this case, the reply message is generated so as to include linkage state information indicating the linkage form that has been input in step S3201. FIG. 34 is a diagram illustrating an example of such a reply message.

When predetermined time passes (in step S3203) without designated any linkage form (NO in step S3202), in step S3204, the CPU 101 generates a reply message to transmit it to the image forming apparatus 1 of the linkage source. In this case, the reply message is generated so as to include a linkage form included in a request message.

Figure 35:
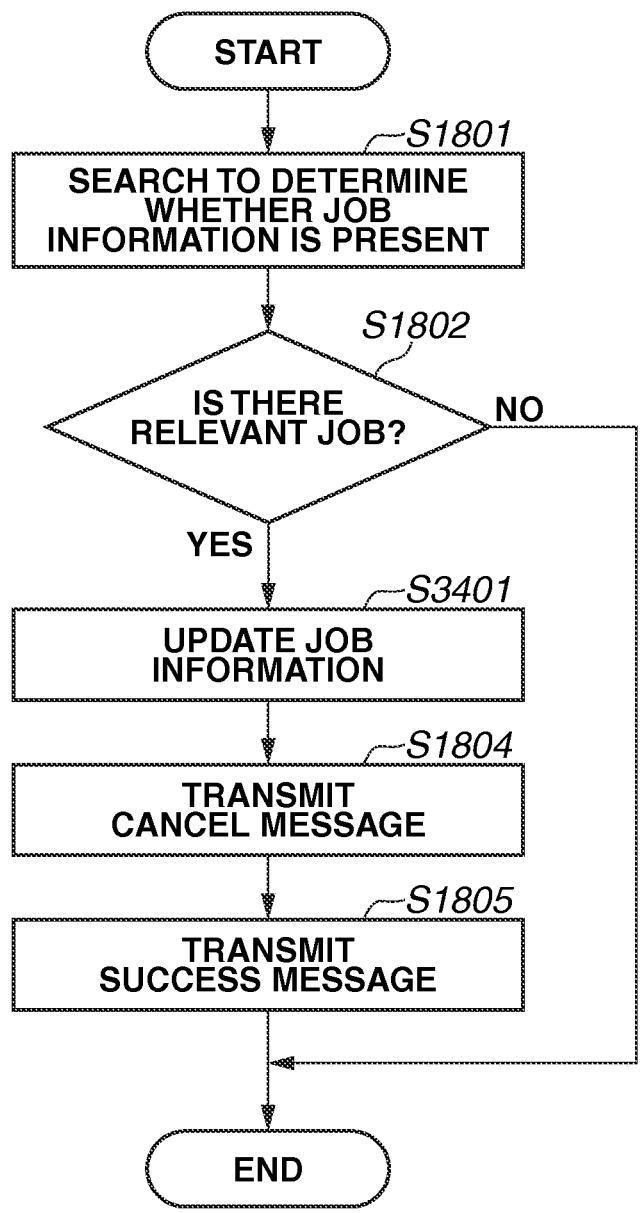
FIG. 35 is a flowchart illustrating a process during reception of a reply message.

FIG. 35 is a flowchart illustrating a process during reception of a reply message by the image forming apparatus 1 of the linkage source. This process is executed by the message reception unit 20 of the CPU 101. Steps similar to those of the flowchart of the first exemplary embodiment illustrated in FIG. 20 are denoted by the similar step numbers.

The process of steps S1801 and S1802 is similar to that of the first exemplary embodiment. When there is a job matched with a condition in the job list 303 (YES in step S1802), in step S3401, the CPU 101 updates the job information 304 of the job. The CPU 101 updates the job information 303 to "Linkage Form" included in the reply message that has received the "Linkage Form" in addition to the update content of step S1803 of the first exemplary embodiment illustrated in FIG. 20. Accordingly, the linkage form designated at the linkage designation is reflected on the linkage job.

Thus, according to the fourth exemplary embodiment, the linkage form can be changed in the image forming apparatus of the linkage destination. As a result, in addition to the effects of the first to third exemplary embodiments, linkage taking the state of the image forming apparatus of the linkage destination into consideration is enabled.

According to each of the exemplary embodiments, at each of the image forming apparatus 1 and the image forming apparatus 2, the user is checked based on the user identification information. Thus, establishment of linkage between the image forming apparatuses by an erroneous operation can be prevented.

The exemplary embodiments have been described by way of a case where the linkage is established between the image forming apparatuses having the scanner and printer functions. In another exemplary embodiment, an image forming apparatus can have part of such functions. In still yet another exemplary embodiment, other information processing apparatuses can be employed, such as a facsimile, a camera, a video camera, and an image viewer.

Additional embodiments can also be realized by a computer of a system or apparatus that reads out and executes computer executable instructions recorded on a storage medium (e.g., computer-readable storage medium) to perform the functions of one or more of the above-described embodiment(s), and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that these exemplary embodiments are not seen to be limiting. The scope of the following claims is to be accorded the broadest interpretation so as to encompass all such modifications and equivalent structures and functions.

This application claims the benefit of Japanese Patent Application No. 2013-140550 filed Jul. 4, 2013, which is hereby incorporated by reference herein in its entirety.

What is claimed is:

1. An information processing apparatus, comprising:
an acquisition unit configured to acquire user identification information for identifying a user;
a reception unit configured to receive a request message for requesting establishment of linkage and that includes user identification information from another information processing apparatus;
a determination unit configured to determine whether the user identification information included in the request message and the acquired user identification information correspond to each other; and
a transmission unit configured to transmit a reply message permitting linkage to the another information processing apparatus as a response to the request message according to a determination result of the determination unit.

2. The information processing apparatus according to claim 1, further comprising:
an instruction unit configured to enable a user to instruct establishment of the linkage; and
a display unit configured to display an input screen for inputting the user identification information according to an instruction from the user,
wherein the acquisition unit acquires the user identification information input via the input screen.

3. The information processing apparatus according to claim 1, further comprising:
a storage unit configured to store user identification information of a user permitted to log into the information processing apparatus as registered user information; and
a log-in processing unit configured to perform authentication by associating user identification information input by the user with the registered user information,
wherein the acquisition unit acquires the user identification information used for the authentication performed by the log-in processing unit.

4. The information processing apparatus according to claim 1, further comprising a processing unit configured to process a job in linkage with the another information processing apparatus.

5. An information processing apparatus, comprising:
an acquisition unit configured to acquire user identification information for identifying a user;
a first transmission unit configured to transmit a request message, which is for requesting establishment of linkage and that includes the acquired user identification information, to a plurality of other information processing apparatuses;
a reception unit configured to receive a reply message permitting linkage from at least one of the plurality of other information processing apparatuses as a response to the request message; and
a second transmission unit configured to transmit a cancel message for canceling the request of the linkage establishment to information processing apparatuses other than the at least one of the plurality of other information processing apparatuses that is a transmission source of the reply message.

6. The information processing apparatus according to claim 5, further comprising:
an instruction unit configured to enable a user to instruct establishment of the linkage; and
a display unit configured to display an input screen for inputting the user identification information according to an instruction from the user,
wherein the acquisition unit acquires the user identification information input via the input screen.

7. The information processing apparatus according to claim 5, further comprising:
a storage unit configured to store user identification information of a user permitted to log into the information processing apparatus as registered user information; and
a log-in processing unit configured to perform authentication by associating user identification information input by the user with the registered user information,
wherein the acquisition unit acquires the user identification information used for the authentication performed by the log-in processing unit.

8. The information processing apparatus according to claim 5, further comprising a processing unit configured to process a job in linkage with the at least one of the plurality of other information processing apparatuses that is a transmission source of the reply message.

9. A method for controlling an information processing apparatus, comprising:
acquiring user identification information for identifying a user;
receiving a request message for requesting establishment of linkage and that includes user identification information from another information processing apparatus;
determining whether the user identification information included in the received request message and the acquired user identification information correspond to each other; and
transmitting a reply message permitting linkage to the another information processing apparatus as a response to the request message according to a determination result.

10. A non-transitory computer-readable storage medium storing computer executable instructions for causing a computer to execute the control method according to claim 9.

11. A method for an information processing apparatus, comprising:
acquiring user identification information for identifying a user;
transmitting a request message, which is for requesting establishment of linkage and that includes the acquired user identification information, to a plurality of other information processing apparatuses;
receiving a reply message permitting linkage from at least one of the plurality of other information processing apparatuses in response to the request message; and
transmitting a cancel message for canceling the request of the linkage establishment to information processing apparatuses other than the at least one of the plurality of other information processing apparatus that is a transmission source of the received reply message.

12. A non-transitory computer-readable storage medium storing computer executable instructions for causing a computer to execute the control method according to claim 11.

* * * * *